United States Patent
Ushanov et al.

(10) Patent No.: US 11,288,333 B2
(45) Date of Patent: Mar. 29, 2022

(54) METHOD AND SYSTEM FOR ESTIMATING USER-ITEM INTERACTION DATA BASED ON STORED INTERACTION DATA BY USING MULTIPLE MODELS

(71) Applicant: YANDEX EUROPE AG, Lucerne (CH)

(72) Inventors: Dmitry Valerievich Ushanov, Moscow (RU); Roman Alekseevich Votyakov, Moscow (RU); Pavel Andreevich Parkhomenko, Engels (RU)

(73) Assignee: YANDEX EUROPE AG, Lucerne (CH)

( * ) Notice: Subject to any disclaimer, the term of this patent is extended or adjusted under 35 U.S.C. 154(b) by 366 days.

(21) Appl. No.: 16/503,546

(22) Filed: Jul. 4, 2019

(65) Prior Publication Data

US 2020/0110783 A1    Apr. 9, 2020

(30) Foreign Application Priority Data

Oct. 8, 2018 (RU) .......................... RU2018135362

(51) Int. Cl.
*G06F 16/00* (2019.01)
*G06F 16/9535* (2019.01)
(Continued)

(52) U.S. Cl.
CPC .......... *G06F 16/9535* (2019.01); *G06N 3/04* (2013.01); *G06Q 50/01* (2013.01)

(58) Field of Classification Search
CPC combination set(s) only.
See application file for complete search history.

(56) References Cited

U.S. PATENT DOCUMENTS

| 5,745,600 A | 4/1998 | Chen et al. |
| 7,007,242 B2 | 2/2006 | Suomela et al. |

(Continued)

FOREIGN PATENT DOCUMENTS

| CN | 103077220 A | 5/2013 |
| CN | 103167330 A | 6/2013 |

(Continued)

OTHER PUBLICATIONS

Office Action with regard to the counterpart U.S. Appl. No. 15/607,555 dated Jun. 11, 2021.

(Continued)

*Primary Examiner* — Farhan M Syed
(74) *Attorney, Agent, or Firm* — BCF LLP

(57) ABSTRACT

A method and server for estimating interaction data are disclosed. A user and a digital content item that the user has interacted with form an occurred pair. The method includes retrieving (i) interaction data of a first type associated with respective ones of the occurred pairs, and (ii) interaction data of a second type associated with respective ones of the occurred pairs. The first type is distinct from the second type. The method also includes (i) applying a first model to the interaction data of the first type, thereby estimating interaction data of the first type for non-occurred pairs, and (ii) applying a second model to the interaction data of the second type, thereby estimating interaction data of the second type for the non-occurred pairs. The interaction data is estimated such that the non-occurred pairs are associated with respective estimated interaction data of the first type and second type.

26 Claims, 9 Drawing Sheets

(51) Int. Cl.
*G06Q 50/00* (2012.01)
*G06N 3/04* (2006.01)

(56) References Cited

U.S. PATENT DOCUMENTS

| | | |
|---|---|---|
| 7,328,216 B2 | 2/2008 | Hofmann et al. |
| 7,451,173 B1 | 11/2008 | Van et al. |
| 7,502,789 B2 | 3/2009 | Yao et al. |
| 7,540,051 B2 | 6/2009 | Gundersen et al. |
| D607,463 S | 1/2010 | Krieter et al. |
| 7,685,200 B2 | 3/2010 | Gunawardena et al. |
| 7,685,232 B2 | 3/2010 | Gibbs et al. |
| D613,300 S | 4/2010 | Chaudhri |
| 7,849,076 B2 | 12/2010 | Zheng et al. |
| 8,010,527 B2 | 8/2011 | Denoue et al. |
| 8,225,195 B1 | 7/2012 | Bryar et al. |
| 8,244,740 B2 | 8/2012 | Gruenhagen et al. |
| 8,271,898 B1 | 9/2012 | Mattos et al. |
| 8,285,602 B1 | 10/2012 | Yi et al. |
| 8,290,818 B1 | 10/2012 | Levitan et al. |
| 8,296,179 B1 | 10/2012 | Rennison |
| 8,301,623 B2 | 10/2012 | Chakrabarti et al. |
| 8,386,955 B1 | 2/2013 | Weber et al. |
| 8,412,726 B2 | 4/2013 | Yan et al. |
| 8,429,184 B2 | 4/2013 | Ismalon |
| D682,844 S | 5/2013 | Friedlander et al. |
| 8,478,664 B1 | 7/2013 | Xavier et al. |
| 8,478,750 B2 | 7/2013 | Rao et al. |
| 8,510,252 B1 | 8/2013 | Gargi et al. |
| D691,619 S | 10/2013 | Satterfield et al. |
| 8,554,601 B1 | 10/2013 | Marsh et al. |
| D693,833 S | 11/2013 | Inose et al. |
| 8,583,418 B2 * | 11/2013 | Silverman ............... G10L 13/08 704/9 |
| 8,600,968 B2 | 12/2013 | Holenstein et al. |
| 8,606,792 B1 | 12/2013 | Jackson et al. |
| 8,655,829 B2 * | 2/2014 | Flinn ................ G06F 16/951 706/52 |
| 8,676,736 B2 | 3/2014 | Pilaszy et al. |
| 8,683,374 B2 | 3/2014 | Vaughan et al. |
| 8,712,937 B1 | 4/2014 | Bacus et al. |
| 8,751,507 B2 | 6/2014 | Kim et al. |
| 8,869,042 B2 | 10/2014 | Kast |
| 8,886,797 B2 | 11/2014 | Gannu et al. |
| 8,893,042 B2 | 11/2014 | Laurie et al. |
| 8,893,043 B2 | 11/2014 | Dodson et al. |
| 8,903,834 B2 | 12/2014 | Ciancutti et al. |
| 8,910,070 B2 | 12/2014 | Goodger et al. |
| 8,914,399 B1 | 12/2014 | Paleja et al. |
| 8,935,258 B2 | 1/2015 | Svore et al. |
| 8,972,391 B1 | 3/2015 | McDonnell et al. |
| 8,972,865 B2 | 3/2015 | Hansen et al. |
| 8,983,888 B2 | 3/2015 | Nice et al. |
| 8,996,530 B2 | 3/2015 | Luvogt et al. |
| 9,053,416 B1 | 6/2015 | De Leo et al. |
| D733,747 S | 7/2015 | Jeong et al. |
| 9,098,248 B2 | 8/2015 | Suzuki et al. |
| 9,098,551 B1 | 8/2015 | Fryz et al. |
| 9,122,989 B1 | 9/2015 | Morris et al. |
| D751,570 S | 3/2016 | Lee et al. |
| D751,571 S | 3/2016 | Lee et al. |
| D751,572 S | 3/2016 | Lee et al. |
| D752,601 S | 3/2016 | Lam |
| D752,636 S | 3/2016 | Yoon et al. |
| 9,317,498 B2 * | 4/2016 | Baker .................. G06F 40/295 |
| D755,805 S | 5/2016 | Zankowski et al. |
| D755,806 S | 5/2016 | Zankowski et al. |
| D755,832 S | 5/2016 | Liu et al. |
| D757,788 S | 5/2016 | Shrivastava |
| 9,348,898 B2 | 5/2016 | Nice et al. |
| 9,396,258 B2 | 7/2016 | Chu et al. |
| 9,405,741 B1 | 8/2016 | Schaaf et al. |
| D766,274 S | 9/2016 | Che et al. |
| 9,471,671 B1 | 10/2016 | Juang et al. |
| 9,473,803 B2 | 10/2016 | Wang |
| 9,569,785 B2 | 2/2017 | Alon et al. |
| 9,582,767 B2 | 2/2017 | Somekh et al. |
| 9,660,947 B1 | 5/2017 | Hart |
| 9,703,783 B2 | 7/2017 | Yi et al. |
| 9,785,883 B2 | 10/2017 | Luvogt et al. |
| 9,836,533 B1 | 12/2017 | Levi et al. |
| 9,836,765 B2 | 12/2017 | Hariri et al. |
| 9,846,836 B2 | 12/2017 | Gao et al. |
| D806,723 S | 1/2018 | Gussev et al. |
| 9,900,659 B1 | 2/2018 | Norum et al. |
| 9,916,613 B1 | 3/2018 | Dorner et al. |
| 10,003,924 B2 * | 6/2018 | Krasnikov ............ H04W 4/025 |
| 10,051,304 B2 | 8/2018 | Tidwell et al. |
| D828,369 S | 9/2018 | Arutyunyan et al. |
| 10,102,559 B1 | 10/2018 | Jain et al. |
| 10,114,901 B2 * | 10/2018 | Mitrovic ............. G06F 16/9535 |
| 10,149,958 B1 * | 12/2018 | Tran ...................... G16H 50/20 |
| 10,242,259 B2 | 3/2019 | Hagelin |
| D847,163 S | 4/2019 | Matsumura |
| 10,909,576 B1 | 2/2021 | Arivukkarasu et al. |
| 11,074,495 B2 * | 7/2021 | Zadeh .................. G06K 9/3233 |
| 2002/0054164 A1 | 5/2002 | Uemura |
| 2002/0198882 A1 | 12/2002 | Linden et al. |
| 2004/0158497 A1 | 8/2004 | Brand |
| 2004/0260621 A1 | 12/2004 | Foster et al. |
| 2005/0076365 A1 | 4/2005 | Popov et al. |
| 2005/0086110 A1 | 4/2005 | Haley et al. |
| 2005/0097190 A1 | 5/2005 | Abdelhak |
| 2006/0031114 A1 | 2/2006 | Zommers |
| 2006/0041548 A1 | 2/2006 | Parsons et al. |
| 2006/0293065 A1 | 12/2006 | Chew et al. |
| 2008/0134043 A1 | 6/2008 | Georgis et al. |
| 2008/0222132 A1 | 9/2008 | Pan et al. |
| 2008/0243733 A1 | 10/2008 | Black |
| 2008/0250039 A1 | 10/2008 | Franks et al. |
| 2008/0256017 A1 | 10/2008 | Murakami |
| 2008/0266289 A1 | 10/2008 | Park |
| 2008/0281711 A1 | 11/2008 | Bridges et al. |
| 2008/0294617 A1 | 11/2008 | Chakrabarti et al. |
| 2009/0006371 A1 | 1/2009 | Denoue |
| 2009/0006373 A1 | 1/2009 | Chakrabarti et al. |
| 2009/0006398 A1 | 1/2009 | Lam et al. |
| 2009/0055385 A1 | 2/2009 | Jeon et al. |
| 2009/0150935 A1 | 6/2009 | Peters et al. |
| 2009/0163183 A1 | 6/2009 | O'Donoghue et al. |
| 2009/0199113 A1 | 8/2009 | McWhinnie et al. |
| 2009/0249217 A1 | 10/2009 | Narayanaswami |
| 2009/0276368 A1 | 11/2009 | Martin et al. |
| 2009/0327941 A1 | 12/2009 | Fong et al. |
| 2010/0050067 A1 | 2/2010 | Curwen et al. |
| 2010/0070454 A1 | 3/2010 | Masuda et al. |
| 2010/0070928 A1 | 3/2010 | Goodger et al. |
| 2010/0082422 A1 | 4/2010 | Heilig et al. |
| 2010/0131844 A1 | 5/2010 | Wohlert |
| 2010/0175018 A1 | 7/2010 | Petschnigg et al. |
| 2010/0205542 A1 | 8/2010 | Walman |
| 2010/0241597 A1 | 9/2010 | Chen et al. |
| 2010/0251304 A1 | 9/2010 | Donoghue et al. |
| 2010/0312650 A1 | 12/2010 | Pinckney et al. |
| 2010/0312724 A1 | 12/2010 | Pinckney et al. |
| 2011/0029636 A1 | 2/2011 | Smyth et al. |
| 2011/0035388 A1 | 2/2011 | Im et al. |
| 2011/0047136 A1 | 2/2011 | Dehn |
| 2011/0047491 A1 | 2/2011 | Hwang et al. |
| 2011/0066497 A1 | 3/2011 | Gopinath et al. |
| 2011/0072011 A1 | 3/2011 | Qiao |
| 2011/0072013 A1 | 3/2011 | Mosoi et al. |
| 2011/0107223 A1 | 5/2011 | Tilton et al. |
| 2011/0112981 A1 | 5/2011 | Park et al. |
| 2011/0125763 A1 | 5/2011 | Takanen et al. |
| 2011/0179081 A1 | 7/2011 | Ovsjanikov et al. |
| 2011/0208732 A1 | 8/2011 | Melton et al. |
| 2011/0213761 A1 | 9/2011 | Song et al. |
| 2011/0246406 A1 | 10/2011 | Lahav et al. |
| 2011/0252050 A1 | 10/2011 | Palleti et al. |
| 2011/0258185 A1 | 10/2011 | Acharya et al. |
| 2011/0302117 A1 | 12/2011 | Pinckney et al. |
| 2011/0302158 A1 | 12/2011 | Sanders |
| 2011/0320450 A1 | 12/2011 | Liu et al. |

(56) References Cited

U.S. PATENT DOCUMENTS

| | | |
|---|---|---|
| 2012/0030159 A1 | 2/2012 | Pilaszy et al. |
| 2012/0054794 A1 | 3/2012 | Kim et al. |
| 2012/0059707 A1 | 3/2012 | Goenka et al. |
| 2012/0143871 A1 | 6/2012 | Liebald et al. |
| 2012/0158685 A1 | 6/2012 | White et al. |
| 2012/0159337 A1 | 6/2012 | Travilla et al. |
| 2012/0191776 A1 | 7/2012 | Ruffner et al. |
| 2012/0209907 A1 | 8/2012 | Andrews et al. |
| 2012/0254097 A1* | 10/2012 | Flinn .............. G06N 7/02 706/52 |
| 2012/0278767 A1 | 11/2012 | Stibel et al. |
| 2012/0288153 A1 | 11/2012 | Tojo et al. |
| 2012/0304073 A1 | 11/2012 | Mandic et al. |
| 2012/0317104 A1 | 12/2012 | Radlinski et al. |
| 2012/0323349 A9 | 12/2012 | Khedouri et al. |
| 2013/0009990 A1 | 1/2013 | Hsu et al. |
| 2013/0024471 A1* | 1/2013 | Mitrovic .......... G06F 16/9537 707/769 |
| 2013/0031090 A1 | 1/2013 | Posse et al. |
| 2013/0041896 A1 | 2/2013 | Ghani et al. |
| 2013/0046772 A1 | 2/2013 | Gu et al. |
| 2013/0047112 A1 | 2/2013 | Waeller |
| 2013/0073988 A1 | 3/2013 | Groten et al. |
| 2013/0080968 A1 | 3/2013 | Hanson et al. |
| 2013/0085871 A1 | 4/2013 | Goss et al. |
| 2013/0111395 A1 | 5/2013 | Ying et al. |
| 2013/0132515 A1 | 5/2013 | Mostafa et al. |
| 2013/0158693 A1 | 6/2013 | Beckmann et al. |
| 2013/0159243 A1 | 6/2013 | Wei et al. |
| 2013/0179252 A1 | 7/2013 | Dong et al. |
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0241952 A1 | 9/2013 | Richman et al. |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2013/0346545 A1 | 12/2013 | Petersen et al. |
| 2014/0006399 A1 | 1/2014 | Vasudevan et al. |
| 2014/0025532 A1 | 1/2014 | Huang et al. |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0100835 A1* | 4/2014 | Majumdar .......... G06N 3/00 703/11 |
| 2014/0101142 A1 | 4/2014 | Gomez et al. |
| 2014/0101192 A1 | 4/2014 | Sabah et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0207622 A1 | 7/2014 | Vijayaraghavan et al. |
| 2014/0250390 A1 | 9/2014 | Holmes et al. |
| 2014/0278308 A1 | 9/2014 | Liu et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2014/0380219 A1 | 12/2014 | Cartan |
| 2015/0006286 A1* | 1/2015 | Liu .................. G06Q 30/0269 705/14.53 |
| 2015/0039406 A1 | 2/2015 | Dubey et al. |
| 2015/0052003 A1 | 2/2015 | Tang et al. |
| 2015/0058264 A1 | 2/2015 | Hughes et al. |
| 2015/0066643 A1 | 3/2015 | Choi et al. |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0169557 A1 | 6/2015 | Ciordas et al. |
| 2015/0178282 A1 | 6/2015 | Gorur et al. |
| 2015/0189070 A1 | 7/2015 | Baker |
| 2015/0220835 A1 | 8/2015 | Wilson et al. |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1 | 11/2015 | Cho et al. |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0347920 A1 | 12/2015 | Medlock et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | Macadaan et al. |
| 2016/0019581 A1 | 1/2016 | Wu et al. |
| 2016/0021179 A1 | 1/2016 | James et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0117397 A1 | 4/2016 | Bansal et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0188739 A1 | 6/2016 | Tang et al. |
| 2016/0196244 A1 | 7/2016 | Greenberg et al. |
| 2016/0210289 A1 | 7/2016 | Esinovskaya et al. |
| 2016/0239871 A1 | 8/2016 | Yu et al. |
| 2016/0259790 A1 | 9/2016 | Mashiach et al. |
| 2016/0274744 A1 | 9/2016 | Neumann et al. |
| 2016/0275804 A1 | 9/2016 | Koppel et al. |
| 2016/0283481 A1 | 9/2016 | Morley et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0011409 A1 | 1/2017 | Eager et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0053646 A1 | 2/2017 | Watanabe et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |
| 2017/0083965 A1 | 3/2017 | Sun |
| 2017/0091194 A1 | 3/2017 | Spiegel |
| 2017/0103343 A1 | 4/2017 | Yee et al. |

(56) References Cited

U.S. PATENT DOCUMENTS

| | | | |
|---|---|---|---|
| 2017/0124093 A1 | 5/2017 | Carbonell et al. | |
| 2017/0132230 A1 | 5/2017 | Muralidhar et al. | |
| 2017/0161773 A1 | 6/2017 | Xu et al. | |
| 2017/0293865 A1 | 10/2017 | Sandler | |
| 2017/0337612 A1 | 11/2017 | Galron et al. | |
| 2018/0011937 A1 | 1/2018 | Tikhonov | |
| 2018/0012236 A1 | 1/2018 | Zhuo et al. | |
| 2018/0014038 A1 | 1/2018 | Lamburt et al. | |
| 2018/0020258 A1 | 1/2018 | Jeon et al. | |
| 2018/0049001 A1* | 2/2018 | Volozh | G01S 5/0036 |
| 2018/0075137 A1 | 3/2018 | Lifar | |
| 2018/0096388 A1 | 4/2018 | Lu | |
| 2018/0204111 A1* | 7/2018 | Zadeh | G06N 3/0436 |
| 2018/0336183 A1* | 11/2018 | Lee | G06N 3/0454 |
| 2018/0365562 A1 | 12/2018 | Volkova | |
| 2019/0034432 A1 | 1/2019 | Rybalchenko et al. | |
| 2019/0060602 A1* | 2/2019 | Tran | G16H 20/30 |
| 2019/0069030 A1 | 2/2019 | Jackman et al. | |
| 2019/0130296 A1 | 5/2019 | Basu et al. | |
| 2019/0236448 A1* | 8/2019 | Piatt | G06F 11/1451 |
| 2019/0342616 A1 | 11/2019 | Domm et al. | |
| 2020/0007936 A1 | 1/2020 | Salomatin et al. | |
| 2020/0090247 A1 | 3/2020 | Sokolov et al. | |
| 2020/0184278 A1* | 6/2020 | Zadeh | G06F 16/43 |
| 2020/0202073 A1 | 6/2020 | Ghulati | |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 103559262 B | 10/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| CN | 107577682 A | 1/2018 |
| CN | 104903889 B | 5/2018 |
| CN | 108346072 A | 7/2018 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2417419 C2 | 4/2011 |
| RU | 2417437 C2 | 4/2011 |
| RU | 2419858 C2 | 5/2011 |
| RU | 2451986 C2 | 11/2011 |
| RU | 2481748 C2 | 5/2013 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| RU | 2580516 C2 | 4/2016 |
| RU | 2605039 C2 | 12/2016 |
| RU | 2629449 C2 | 8/2017 |
| RU | 2632100 C2 | 10/2017 |
| RU | 2632132 C1 | 10/2017 |
| RU | 2632138 C2 | 10/2017 |
| RU | 2660602 C1 | 7/2018 |
| RU | 2017101241 A | 7/2018 |
| RU | 2663478 C2 | 8/2018 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |
| WO | 2016030702 A1 | 3/2016 |
| WO | 2019043381 A1 | 3/2019 |

OTHER PUBLICATIONS

Notice of Allowance with regard to the U.S. Appl. No. 16/503,560 dated Jun. 8, 2021.

Levy et al., "Neural Ward Embedding as Implicit Matrix Factorization", Advances in Neural Information Processing, 2014, p. 2177-2185 (Year: 2014)—cited in the Office Action with regard to the counterpart U.S. Appl. No. 15/607,555 dated Jun. 11, 2021.

English abstract of CN 103838842 retrieved from Espacenet on Feb. 3, 2017.

Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.

Mozilla / newnewtab, https://github.com/mozilla/newnewtab, retrieved on Nov. 11, 2016, 2 pages.

Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.

Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.

Opera Help, Speed Dial, http://help.opera.com/Windows/12.10/en/speeddial.html, retrieved on Nov. 11, 2016, 2 pages.

Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.

Russian Search Report from RU patent application No. 2015141291 dated Nov. 2, 2016.

Extended European Search Report from EP16190997, dated Feb. 16, 2017, Herry, Tzvetanka.

European Search report from EP 16185747, Siodmok, Wojciech, dated Jan. 18, 2017.

English abstract of CN103678672 retrieved from Espacenet on Jan. 20, 2017.

English abstract of CN103077220 retrieved from Espacenet on Jan. 20, 2017.

Russian Search Report dated Nov. 9, 2016 from Russian Patent Application No. 2015136684.

Amatriain et al., System Architectures for Personalization and Recommendation, http://techblog.netflix.com/2013/03/system-architectures-for.html, retrieved on May 30, 2015.

English Abstract of CN303532062 retrieved on Google Translate on Apr. 4, 2017.

Kumar et al., "Knowledge Retrieval from Web Server Logs Using Web Usage Mining", International Journal of Science and Research (IJSR), 2015, vol. 4, Issue 3, pp. 2173-2176.

Kim et al., "Ranking Web Documents with Dynamic Evaluation by Expert Groups", J. Eder and M. Missikoff (Eds.), CAISE, 2003, pp. 437-448.

Russian Search Report from RU patent application No. 2016127447 dated Feb. 7, 2017.

Pilaszy et al., "Fast ALS-based Matrix Factorization for Explicit and Implicit Feedback Datasets", RECSYS'10, 2010, pp. 71-78.

U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Design U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
U.S. Appl. No. 15/607,555, filed May 29, 2017.

(56) References Cited

OTHER PUBLICATIONS

Russian Search Report from RU patent application No. 2015141108 dated Sep. 7, 2016.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
Youtube Account: RnStore, "Zmags Demo", (May 19, 2011), times stamp 1:54/3:56, 2:20/3:56, PDF Attached, URL: https://www.youtube.com/watch?v=AsBrLdoEJgA.
Youtube Account: iappletech128, "Close Tabs in Safari by Swiping", (Oct. 20, 2013), time stamp 0:20-0:35/1:18, PDF Attached, URL: https://www.youtube.com/watch?v=V8TTbYrFSmg.
Youtube Account: macmostvideo, "Viewing Photos With the Finder (MacMost Now 612)", (Sep. 30, 2011), time stamp 2:05-2:25, PDF Attached, URL: https://www.youtube.com/watch?v=tYoJI6G7Hkg.
European Examination Report with regard to the counterpart patent application No. EP 16190999.9 dated Jun. 29, 2018.
U.S. Appl. No. 16/010,152, filed Jun. 15, 2018.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (in the Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (in the Notice of Allowance with regard to the counterpart U.S. Appl. No. 15/592,745 dated Oct. 11, 2018).
U.S. Appl. No. 16/009,929, filed Jun. 15, 2018.
Design U.S. Appl. No. 29/703,684, filed Aug. 29, 2019.
U.S. Appl. No. 16/370,286, filed Mar. 29, 2019.
U.S. Appl. No. 16/372,553, filed Apr. 2, 2019.
U.S. Appl. No. 16/371,624, filed Apr. 1, 2019.
U.S. Appl. No. 16/503,560, filed Jul. 4, 2019.
Office Action with regard to the counterpart U.S. Appl. No. 16/371,624 dated Dec. 9, 2020.
Office Action with regard to the counterpart U.S. Appl. No. 16/009,929 dated Aug. 2, 2021.
Menczer, "Fake Online News Spreads Through Social Echo Chambers", The Conversation, Computing, ScientificAmerican.com, Nov. 28, 2016, pp. 1-10.
Office Action with regard to the counterpart U.S. Appl. No. 16/010,152 dated Apr. 7, 2020.
Search Report with regard to the counterpart RU Patent Application No. 2018135362 completed Mar. 26, 2020.
English Abstract for CN104903889 retrieved on Espacenet on Apr. 16, 2020.
Notice of Allowance with regard to the counterpart U.S. Appl. No. 16/370,286 dated Mar. 31, 2020.
"Browser Amigo by Mail.ru", https://www.youtube.com/watch?v=9IPOwpplcWM accessed on Mar. 9, 2020; https://www.youtube.com/watch?v=vdxnXZT2tQo accessed on Mar. 9, 2020, pdf 7 pages.
Search Report with regard to the counterpart RU Patent Application No. 2018132708 completed Feb. 18, 2020.
Search Report with regard to the counterpart RU Patent Application No. 2018132713 completed Feb. 21, 2020.
English Abstract for RU2017101241 retrieved on Espacenet on Mar. 12, 2020.
English Abstract for CN107577682 retrieved on Espacenet on Mar. 12, 2020.
English Abstract for CN108346072 retrieved on Espacenet on Mar. 12, 2020.
English Abstract for CN104317835 retrieved on Espacenet on May 7, 2018.
English Abstract for CN105893398 retrieved on Espacenet on May 7, 2018.
English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
English Abstract for CN103473354 retrieved on Espacenet on Jan. 4, 2019.
English Abstract for JP2009015834 retrieved on Espacenet on Mar. 21, 2019.
Notice of Allowance with regard to the counterpart U.S. Appl. No. 15/262,332 dated Mar. 18, 2019.
Office Action with regard to the counterpart U.S. Appl. No. 15/592,745 dated Mar. 8, 2019.
Office Action with regard to the counterpart U.S. Appl. No. 15/262,318 dated Apr. 1, 2019.
Search Report with regard to the counterpart U.S. Patent Application No. 2017140972 completed May 13, 2019.
Office Action with regard to the counterpart U.S. Appl. No. 15/263,493 dated May 9, 2019.
Martin Beck, "Facebook Now Asks Why You're Hiding That Ad, To Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Notice of Allowance received with regard to the counterpart U.S. Appl. No. 15/606,658 dated Jun. 26, 2019.
Notice of Allowance received with regard to the counterpart U.S. Appl. No. 29/590,781 dated Dec. 20, 2019.
Search Report with regard to the counterpat RU Patent Application No. 2018132716 completed Nov. 25, 2019.
Office Action with regard to the counterpart U.S. Appl. No. 16/372,553 dated Jul. 29, 2021.
Office Action with regard to the counterpart U.S. Appl. No. 16/010,152 dated Apr. 2, 2021.
Office Action with regard to the counterpart U.S. Appl. No. 16/009,929 dated Mar. 16, 2021.

(56) References Cited

OTHER PUBLICATIONS

Office Action with regard to the counterpart U.S. Appl. No. 15/607,555 dated Aug. 17, 2021.
Search Report with regard to the counterpart RU Patent Application No. 2018135455 completed May 22, 2020.
Office Action with regard to the U.S. Appl. No. 16/371,624 dated Jul. 7, 2021.
Office Action with regard to the counterpart U.S. Appl. No. 16/503,560 dated Apr. 15, 2021.
Office Action with regard to the counterpart U.S. Appl. No. 15/607,555 dated Apr. 19, 2021.
Xiao et al., "Research and Implementation of Hybrid Recommandation Algorithm Based on Collaborative Filtering and Word2Vec", 2015 8th International Symposium on Computational Intelligence and Design, 2015 (Year: 2015).
Koren et al., "Matrix Factorization Techniques for Recommander Systems", IEEE Computer, vol. 42, Issue 8, Aug. 2009 (Year: 2009).
Office Action with regard to the U.S. Appl. No. 16/009,929 dated Dec. 3, 2021.
Jamali, Mohsen et al., "TrustWalker: A Random Walk Madel for Combining Trust-based and Item-based Recommendation." KDD'09, Jun. 28-Jul. 1, 2009, Paris, France. (Year: 2009).
Office Action with regard to the U.S. Appl. No. 16/934,288 dated Nov. 12, 2021.
Office Action with regard to the U.S. Appl. No. 15/607,555 dated Dec. 9, 2021.
Notice of Allowance with regard to the U.S. Appl. No. 16/371,624 dated Jan. 20, 2022.
"The impact of ad positioning in search engine targeting: a multi-faceted decision problem," by Carsten D. Schultz, Electronic Commerce Research, New York: Springer Nature B.V., Jun. 29, 2018 (Year: 2018).
"Identify, Match, and Target-Penton's Audience-Based Targeting Reaches the Right Individual, Audience, or Company to Accelerate Marketing Programs," PR Newswire, PR Newswire Associated LLC, Aug. 11, 2016 (Year: 2016).

* cited by examiner

METHOD AND SYSTEM FOR ESTIMATING USER-ITEM INTERACTION DATA BASED ON STORED INTERACTION DATA BY USING MULTIPLE MODELS

CROSS-REFERENCE

The present application claims priority from Russian Patent Application No. 2018135362, filed Oct. 8, 2018, entitled "Method and System for Estimating User-Item Interaction Data," the entirety of which is incorporated herein by reference.

FIELD

The present technology relates to computer-implemented recommendation systems in general and specifically to methods and systems for estimating user-item interaction data.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Spain (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can re-run the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommendation system, which system aggregates and recommends content from various sources, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

Another example of the recommendation system is YANDEX.ZEN™ recommendation system. The Yandex.Zen recommendation system recommends digital content (such as articles, news, and video in a personalized feed on the Yandex.Browser start screen). As the user browses the Yandex.Zen server recommended content, the server acquires explicit (by asking whether the user likes to see more of such content in the user's feed) or implicit (by observing user content interactions) feedback. Using the user feedback, the Yandex.Zen server continuously improves the content recommendations presented to the given user.

Typically, recommendation systems provide personalized content to users based on previous user interactions with the recommendation service that can be indicative of user preferences for some particular content rather than other content. For example, if some particular content is associated with a large amount of previous user interactions, this particular content is more likely to be provided as personalized content since a large amount of previous user interactions may be indicative of relevant content.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

It has been appreciated by the developers of the present technology that selection of relevant digital content for users of a recommendation service requires a significant amount of processing power during online operation (i.e. when a content recommendation request is received from a given user of the recommendation service). State of the art relevance estimation models may be employed for processing a large amount of digital content in an online mode for determining which digital content should be provided to given users of the recommendation service. However, the execution of these state of the art relevance estimation models is computationally expensive due to a large amount and variety of factors that are needed to be taken into account for estimating relevance of digital content and this results in an important processing power requirement on the recommendation system in online operation.

Embodiments of the present technology have been developed based on developers' appreciation that the processing power requirement for executing a given computationally expensive relevance estimation model in an online mode is an important drawback of recommendation systems since operators need to either (i) acquire more processing power units, which is monetarily expensive or (ii) use less efficient relevance estimation models, which results in a lower user satisfaction with recommended digital content. As such, the developers have developed a solution where a progressive pre-selection of digital content is executed in an online mode prior to execution of the main computationally expensive relevance estimation model. As a result, a comparatively smaller amount of pre-selected data needs to be processed by the main computationally expensive relevance estimation model thereby reducing the processing power requirement for execution of thereof.

It should also be appreciated that estimation of user interaction data is a significant problem in the art since it is generally used for recommending digital content to users of the recommendation service. Indeed, a given user typically does not interact with all digital documents of the recommendation service and, therefore, user interaction data is somewhat "sparse" to the extent where it is difficult to properly estimate relevance of some digital content to given users since these users have not interacted with some digital content and the recommendation system does not have much knowledge to draw from in order to determine whether some digital content would be appreciated by given users if it is recommended thereto.

Limited user interaction data may also lead to additional issues for recommendation services. For example, this may result in a reduced variety of digital content that is recommended to users. The recommendation system may properly estimate relevance of only digital content that is similar to the digital content with which given users have previously interacted with, which is detrimental since users with limited past interactions will only receive a limited number of types of digital content. In another example, this may result in a cyclical discoverability problem for some potentially recommendable digital content. Since user interaction data is not available or limited for some digital documents, even though these digital documents are potentially relevant, they are less likely to be recommended to users of the recommendation service and, since they are less likely to be recommended to users of the recommendation service, a limited amount of user interaction data will be gathered for these digital documents, which results in potentially relevant digital documents not being recommended to users.

Furthermore, state of the art estimation models are usually employed to estimate different types of user interaction data all at once. Application of a given estimation model on all user interaction data may be undesirable because different types of user interaction data, in some cases, may provide mutually exclusive intelligence regarding digital content preferences of a given user. For example, the number of clicks that a given user performed on a given digital document may provide intelligence about a general appeal of the digital document to the given user, whereas the amount of interaction time that the given user spent on the given digital document may provide intelligence about how well the given digital document satisfied the given users needs in digital content once selected. As such, estimating different types of user interaction data all at once may be detrimental for further use in digital content recommendation since intelligence about digital content preferences of users may be biased and hence less interpretable due to the influence of a first type of user interaction data on the estimation of a second type of user interaction data and vice versa.

Embodiments of the present technology have been developed based on developers' appreciation that estimating all types of user interaction data via a single estimation model may result in biased and hence less interpretable intelligence regarding digital content preferences of users of the recommendation service. The developers have devised methods and systems where user interaction data of different types is estimated independently from one another via respective and distinct estimation models specifically tailored to the respective types of user interaction data that they are tasked to estimate.

In accordance with a first broad aspect of the present technology, there is provided a method of estimating user-item interaction data. The method is executable by a server hosting a recommendation service for providing digital content to a user. The user is one of a plurality of users of the service. A given user and a given digital content item that the given user has interacted with form a given occurred user-item pair and user-item interaction data for occurred user-item pairs is stored in a storage communicatively coupled to the server. The method comprises retrieving, by the server from the storage: (i) user-item interaction data of a first type which is associated with respective ones of the occurred user-item pairs, and (ii) user-item interaction data of a second type which is associated with respective ones of the occurred user-item pairs. The first type is distinct from the second type. The method also comprises applying, by the server, a first estimation model to the user-item interaction data of the first type, thereby estimating user-item interaction data of the first type for non-occurred user-item pairs. The method also comprises applying, by the server, a second estimation model to the user-item interaction data of the second type, thereby estimating user-item interaction data of the second type for the non-occurred user-item pairs. As such, the non-occurred user-item pairs are associated with respective estimated user-item interaction data of the first type and of the second type.

In some implementations of the method, the given digital content item is one of: a digital document, a given network resource hosting respective digital documents, and a given publisher publishing respective digital documents.

In some implementations of the method, the first estimation model is a Singular-Value Decomposition (SVD) model.

In some implementations of the method, the second estimation model is either one of: an other SVD model and a Neural Network-based (NN-based) model.

In some implementations of the method, one of the first and the second estimation model is trained prior to the applying the one of the first and the second estimation model.

In some implementations of the method, the applying the first estimation model is executed by the server independently from the applying the second estimation model.

In some implementations of the method, the applying the first estimation model is executed by the server at a first moment in time and the applying the second estimation model is executed by the server at a second moment in time. The first moment in time is distinct from the second moment in time.

In some implementations of the method, the method further comprises generating, by the server, first sets of item features for the respective digital content items based on the user-item interaction data of the first type associated with the occurred and the non-occurred user-item pairs. The first sets of item features are generated such that digital content items with similar digital content have similar first sets of item features. The method further comprises generating, by the server, second sets of item features for the respective digital content items based on the user-item interaction data of the second type associated with the occurred and the non-occurred user-item pairs. The second sets of item features are generated such that digital content items with similar digital content have similar second sets of item features. As such, a given digital content item is associated with a respective first set of item features and a respective second set of item features. The method further comprises storing, by the server, the digital content items in association with the respective first and the respective second sets of item features.

In some implementations of the method, in an online mode at a moment in time when a digital content request is received, by the server, from an electronic device associated with the user, the method further comprises retrieving, by the server from the storage at the moment in time, user-item interaction data of the first type for the occurred user-item pairs associated with the user. The method further comprises generating, by the server, a first set of user features for the user based on the user-item interaction data of the first type for the occurred user-item pairs associated with the user. The first set of user features are generated such that users with similar digital content preferences have similar first sets of user features. The method further comprises retrieving, by the server from the storage at the moment in time, user-item interaction data of the second type for the occurred user-item pairs associated with the user. The method further comprises generating, by the server, a second set of user features for the user based on the user-item interaction data of the second type for the occurred user-item pairs associated with the user. The second set of user features are generated such that users with similar digital content preferences have similar second sets of user features. As such, the first and the second set of user features are associated with the user. The method further comprises determining, by the server, a user-specific value for respective digital content items which is indicative of relevance of the respective digital content to the user by comparing: (i) the respective first set of item features with the first set of user features, and (ii) the respective second set of item features with the second set of user features.

In some implementations of the method, the comparing the respective first set of item features with the first set of user features comprises determining, by the server, a first similarity value between the user and the respective digital content item. Also, the comparing the respective second set of item features with the second set of user features comprises determining, by the server, a second similarity value between the user and the respective digital content item. The user-specific value of the respective digital content item is a weighted combination of the respective first and the respective second similarity value.

In some implementations of the method, the method further comprises selecting, by the server, a subset of digital content items based on the respective user-specific values. The digital content items in the subset of digital content items are associated with topmost user-specific relevance values. The method further comprises selecting, by the server, from the subset of digital content items at least some digital content for providing digital content to the user.

In some implementations of the method, the method further comprises transmitting, by the server, at least some digital content from the at least some digital content items to the electronic device associated with the user.

In some implementations of the method, the first type and the second type are any two of: a number of clicks, a number of likes, a number of dislikes, a number of long clicks and an amount of interaction time.

In some implementations of the method, at least one of the first estimation model and the second estimation model is a Neural Network-based (NN-based) model that comprises a first NN-portion and a second NN-portion.

In some implementations of the method, the first NN-portion is dedicated for generating an embedded item vector based on item data associated with a given item from a given user-item pair. The second NN-portion is dedicated for generating an embedded user vector based on user data associated with a given user from the given user-item pair.

In some implementations of the method, the NN-based model is trained by conditioning the first NN-portion to generate the embedded item vector and the second NN-portion to generate the embedded user vector, such that a similarity value between the embedded item vector and the embedded user vector is indicative of user-item interaction data of a given type for the given user-item pair.

In accordance with a second broad aspect of the present technology, there is provided a server for estimating user-item interaction data. The server hosts a recommendation service for providing digital content to a user. The user is one of a plurality of users of the service. A given user and a given digital content item that the given user has interacted with form a given occurred user-item pair and user-item interaction data for occurred user-item pairs is stored in a storage communicatively coupled to the server. The server is configured to retrieve from the storage: (i) user-item interaction data of a first type which is associated with respective ones of the occurred user-item pairs, and (ii) user-item interaction data of a second type which is associated with respective ones of the occurred user-item pairs. The first type is distinct from the second type. The server is configured to apply a first estimation model to the user-item interaction data of the first type, thereby estimate user-item interaction data of the first type for non-occurred user-item pairs. The server is configured to apply a second estimation model to the user-item interaction data of the second type, thereby estimate user-item interaction data of the second type for the non-occurred user-item pairs. As such, the non-occurred user-item pairs are associated with respective estimated user-item interaction data of the first type and of the second type.

In some implementations of the server, the given digital content item is one of: a digital document, a given network resource hosting respective digital documents, and a given publisher publishing respective digital documents.

In some implementations of the server, the first estimation model is a Singular-Value Decomposition (SVD) model.

In some implementations of the server, the second estimation model is either one of: an other SVD model and a Neural Network-based (NN-based) model.

In some implementations of the server, one of the first and the second estimation model is trained prior to the server being configured to apply the one of the first and the second estimation model.

In some implementations of the server, the server is configured to apply the first estimation model independently from being configured to apply the second estimation model.

In some implementations of the server, the server is configured to apply the first estimation model at a first moment in time. The server is configured to apply the second estimation model at a second moment in time. The first moment in time is distinct from the second moment in time.

In some implementations of the server, at least one of the first estimation model and the second estimation model is a Neural Network-based (NN-based) model that comprises a first NN-portion and a second NN-portion.

In some implementations of the server, the first NN-portion is dedicated for generating an embedded item vector based on item data associated with a given item from a given user-item pair. The second NN-portion is dedicated for generating an embedded user vector based on user data associated with a given user from the given user-item pair.

In some implementations of the server, the NN-based model is trained by the server by conditioning the first NN-portion to generate the embedded item vector and the second NN-portion to generate the embedded user vector, such that a similarity value between the embedded item vector and the embedded user vector is indicative of user-item interaction data of a given type for the given user-item pair.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
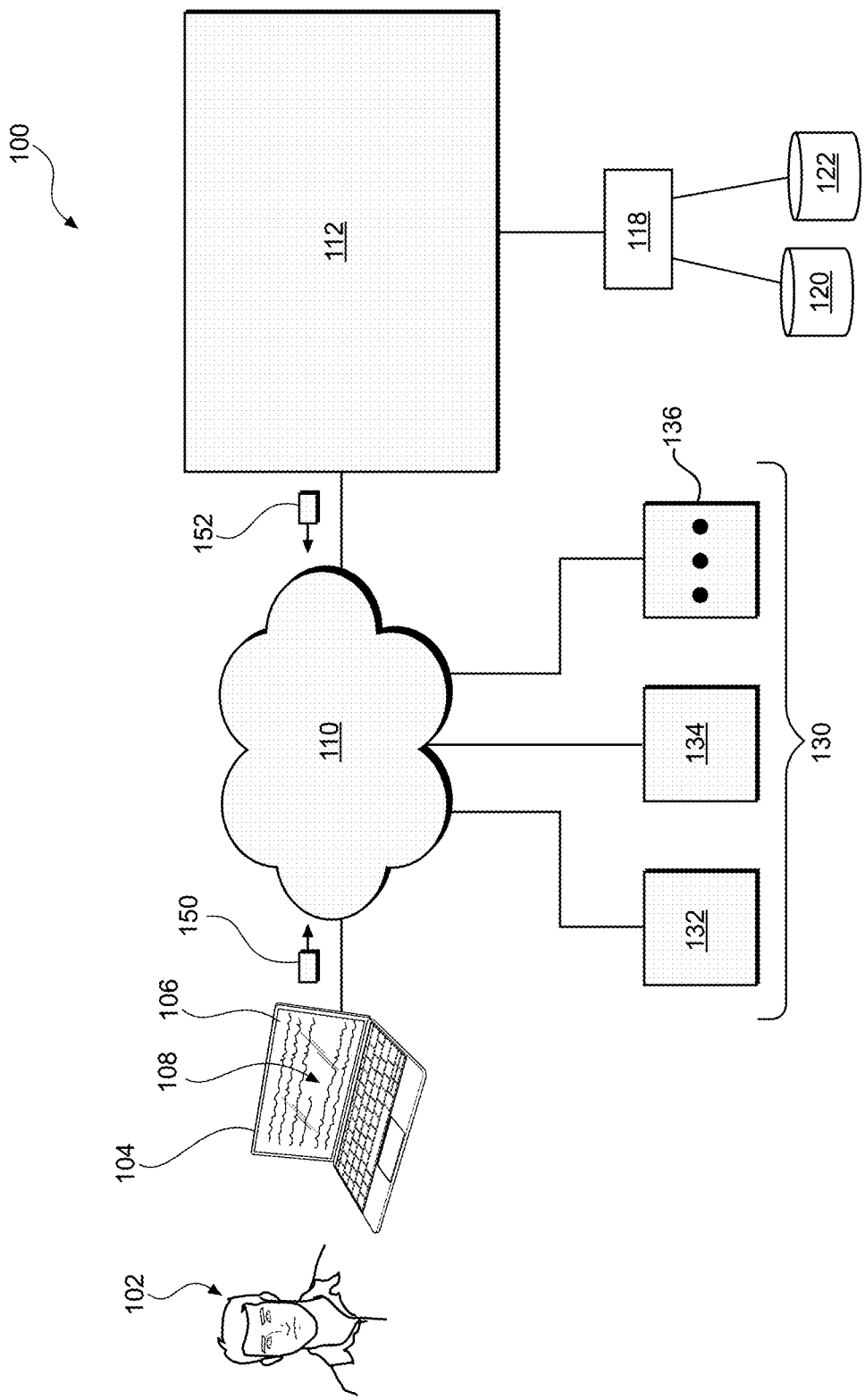
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide digital content recommendations to users of the system 100. For example, a user 102 (a given one of a plurality of users of the system 100) may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the system 100, as will be described in greater detail herein below.

Electronic Device

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

It should be noted that, although only the user 102 associated with the electronic device 104 is depicted in FIG. 1, it is contemplated that the user 102 associated with the electronic device 104 is a given user from the plurality of users of the system 100, and where each one of the plurality of users (not depicted) can be associated with a respective electronic device (not depicted).

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user 102 to receive (or otherwise access) digital content recommendations provided by the system 100, as will be described in greater detail herein below.

How the recommendation application 106 is implemented is not particularly limited. One example of the recommendation application 106 may include the user 102 accessing a web site associated with the recommendation service to access the recommendation application 106. For example, the recommendation application 106 may be accessed by typing in (or otherwise copy-pasting or selecting a link) an URL associated with the recommendation service. Alternatively, the recommendation application 106 may be an application downloaded from a so-called "app store", such as APPSTORE™ or GOOGLEPLAY™ and installed/executed on the electronic device 104. It should be expressly understood that the recommendation application 106 may be accessed using any other suitable means. In yet additional embodiments, the recommendation application 106 functionality may be incorporated into another application, such as a browser application (not depicted) or the like. For example, the recommendation application 106 may be executed as part of the browser application, for example, when the user 102 starts the browser application, the functionality of the recommendation application 106 may be executed.

Generally speaking, the recommendation application 106 comprises a recommendation interface 108, the recommendation interface 108 being displayed on a screen (not separately numbered) of the electronic device 104.

Figure 2:
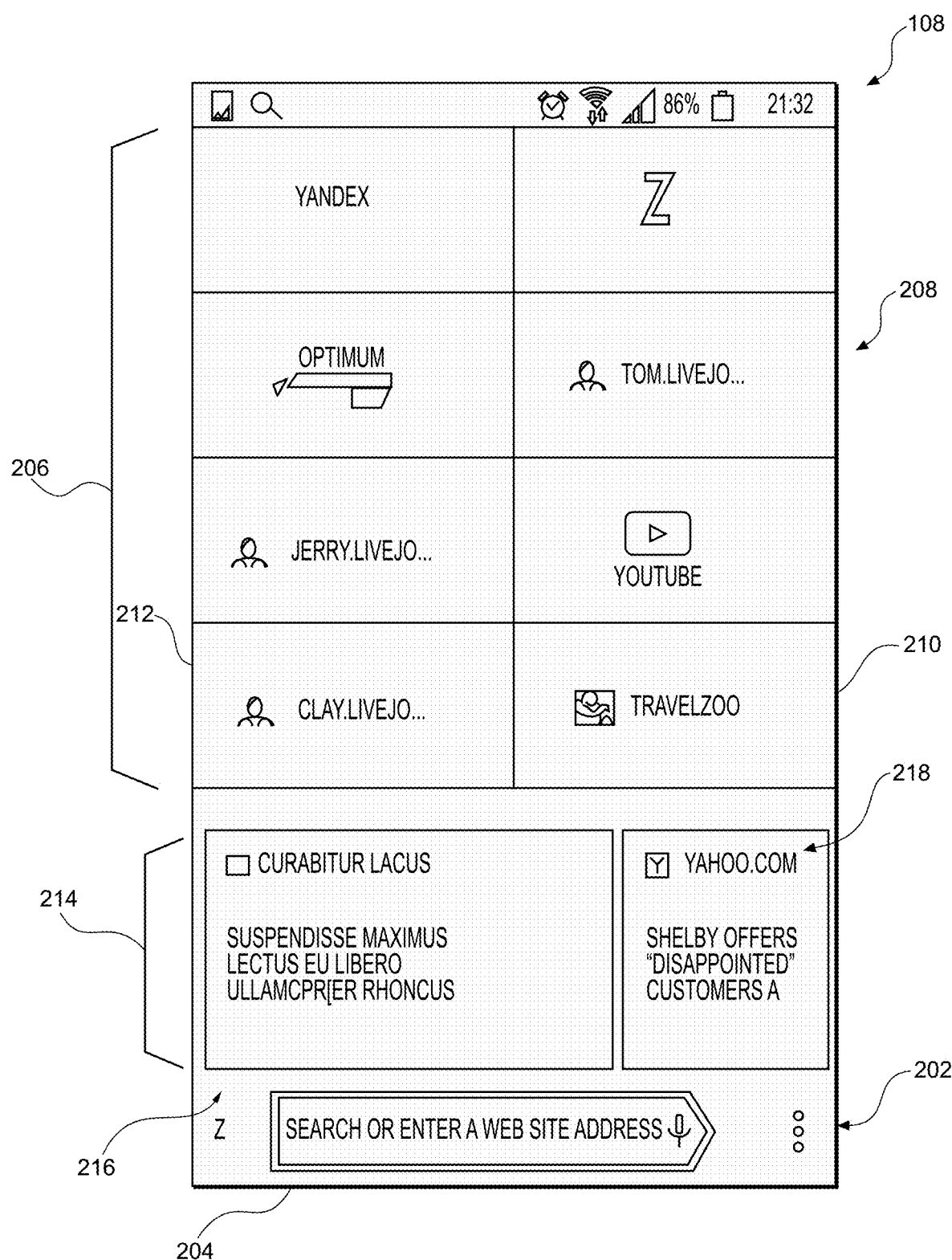
FIG. 2 depicts a screen shot of a recommendation interface implemented in accordance with a non-limiting embodiment of the present technology, the recommendation interface being depicted as displayed on the screen of an electronic device of the system of FIG. 1, the electronic device being implemented as a smart phone.

With reference to FIG. 2, there is depicted a screen shot of the recommendation interface 108 implemented in accordance with a non-limiting embodiment of the present technology (the example of the recommendation interface 108 being depicted as displayed on the screen of the electronic device 104 being implemented as a smart phone).

In some embodiments of the present technology the recommendation interface 108 may be presented/displayed when the user 102 of the electronic device 104 actuates (i.e. executes, run, background-run or the like) the recommendation application 106. Alternatively, the recommendation interface 108 may be presented/displayed when the user 102 opens a new browser window and/or activates a new tab in the browser application. For example, in some embodiments of the present technology, the recommendation interface 108 may act as a "home screen" in the browser application.

The recommendation interface 108 includes a search interface 202. The search interface 202 includes a search query interface 204. The search query interface 204 may be implemented as an "omnibox" which allows entry of a search query for executing a search or a given network address (such as a Universal Remote Locator) for identifying a given network resource (such as a web site) to be accessed. However, the search query interface 204 may be configured to receive one or both of: entry of the search query for executing the search or a given network address (such as a Universal Remote Locator) for identifying a given network resource (such as a web site) to be accessed.

The recommendation interface 108 further includes a links interface 206. The links interface 206 includes a plurality of tiles 208—of which eight are depicted in FIG. 2—only two of which are numbered in FIG. 2—a first tile 210 and a second tile 212.

Using the example of the first tile 210 and the second tile 212—each of the plurality of tiles 208 includes (or acts as) a link to either (i) a web site marked as "favourite" or otherwise marked by the user 102, (ii) a previously visited web site or (iii) the like. The plurality of tiles 208, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 208 may be different. As such, some or all of the plurality of tiles 208 may be implemented as differently shaped buttons, as hyperlinks presented in a list or the like.

As an example, the first tile 210 contains a link to a TRAVELZOO™ web site and the second tile 212 contains a link to a personal live journal web site. Needless to say, the number and content of the individual ones of the plurality of tiles 208 is not particularly limited.

For example, the number of the tiles within the plurality of tiles 208 may be pre-selected by the provider of the recommendation application 106. In some embodiments of the present technology, the number of tiles within the plurality of tiles 208 may be pre-selected based on the size and/or resolution of the screen of the electronic device 104 executing the recommendation application 106. For example, a first number of tiles may be pre-selected for the electronic device 104 executed as a smartphone, a second number of tiles may be pre-selected for the electronic device 104 executed as a tablet, and a third number of tiles may be pre-selected for the electronic device 104 executed as a laptop or desktop computer.

The recommendation interface 108 further includes a recommended digital content set 214. The recommended digital content set 214 includes one or more recommended digital documents, such as a first recommended digital document 216 and a second recommended digital document 218 (the second recommended digital document 218 only partially visible in FIG. 2). Naturally, the recommended digital content set 214 may have more recommended digital documents. In the embodiment depicted in FIG. 2 and in those embodiments where more than one recommended digital documents are present, the user 102 may scroll through the recommended digital content set 214. The scrolling may be achieved by any suitable means. For example, the user 102 can scroll the content of the recommended digital content set 214 by means of actuating a mouse device (not depicted), a key board key (not depicted) or interacting with a touch sensitive screen (not depicted) of or associated with the electronic device 104.

Example provided in FIG. 2 is just one possible implementation of the recommendation interface 108. Another example of the implementation of the recommendation interface 108, as well as an explanation of how the user 102 may interact with the recommendation interface 108 is disclosed in a co-owned Russian Patent Application entitled "A COMPUTER-IMPLEMENTED METHOD OF GENERATING A CONTENT RECOMMENDATION INTERFACE", filed on May 12, 2016 and bearing an application number 2016118519; content of which is incorporated by reference herein in its entirety.

Returning to the description of FIG. 1, the electronic device 104 is configured to generate a request 150 for digital content recommendation. The request 150 may be generated in response to the user 102 providing an explicit indication of the user desire to receive a digital content recommendation. For example, the recommendation interface 108 may provide a button (or another actuatable element) to enable the user 102 to indicate her/his desire to receive a new or an updated digital content recommendation.

As an example only, the recommendation interface 108 may provide an actuatable button that reads "Request content recommendation". Within these embodiments, the request 150 for digital content recommendation can be thought of as "an explicit request" in a sense of the user 102 expressly providing a request for the digital content recommendation.

In other embodiments, the request 150 for digital content recommendation may be generated in response to the user 102 providing an implicit indication of the user desire to receive the digital content recommendation. In some embodiments of the present technology, the request 150 for digital content recommendation may be generated in response to the user 102 starting the recommendation application 106.

Alternatively, in those embodiments of the present technology where the recommendation application 106 is implemented as a browser (for example, a GOOGLE™ browser, a YANDEX™ browser, a YAHOO!™ browser or any other proprietary or commercially available browser application), the request 150 for digital content recommendation may be generated in response to the user 102 opening the browser application and may be generated, for example, without the user 102 executing any additional actions other than activating the browser application.

Optionally, the request 150 for digital content recommendation may be generated in response to the user 102 opening a new tab of the already-opened browser application and may be generated, for example, without the user 102 executing any additional actions other than activating the new browser tab.

Therefore, it is contemplated that in some embodiments of the present technology, the request 150 for digital content recommendation may be generated even without the user 102 knowing that the user 102 may be interested in obtaining a digital content recommendation.

Optionally, the request 150 for digital content recommendation may be generated in response to the user 102 selecting a particular element of the browser application and may be generated, for example, without the user 102 executing any additional actions other than selecting/activating the particular element of the browser application.

Examples of the particular element of the browser application include but are not limited to:
  an address line of the browser application bar;
  a search bar of the browser application and/or a search bar of a search engine web site accessed in the browser application;
  an omnibox (combined address and search bar of the browser application);
  a favourites or recently visited network resources pane; and
  any other pre-determined area of the browser application interface or a network resource displayed in the browser application.

How the content for the recommended digital content set 214 is generated and provided to the electronic device 104 will be described in greater detail herein further below.

Communication Network

The electronic device 104 is communicatively coupled to a communication network 110 for accessing a recommendation server 112 (or simply the server 112).

In some non-limiting embodiments of the present technology, the communication network 110 may be implemented as the Internet. In other embodiments of the present technology, the communication network 110 can be implemented differently, such as any wide-area communication network, local-area communication network, a private communication network and the like.

How a communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

Plurality of Network Resources

Also coupled to the communication network 110 is a plurality of network resources 130 that includes a first network resource 132, a second network resource 134 and a plurality of additional network resources 136. The first network resource 132, the second network resource 134 and the plurality of additional network resources 136 are all network resources accessible by the electronic device 104 (as well as other electronic devices potentially present in the system 100) via the communication network 110. Respective digital content of the first network resource 132, the second network resource 134 and the plurality of additional network resources 136 is not particularly limited.

It is contemplated that any given one of the first network resource 132, the second network resource 134 and the plurality of additional network resources 136 may host (or in other words, host) digital documents having potentially different types of digital content.

For example, digital content of digital documents may include but is not limited to: audio digital content for streaming or downloading, video digital content for streaming or downloading, news, blogs, information about various government institutions, information about points of interest, thematically clustered content (such as content relevant to those interested in kick-boxing), other multi-media digital content, and the like.

In another example, digital content of the digital documents hosted by the first network resource 132, the second network resource 134 and the plurality of additional network resources 136 may be text-based. Text-based digital content may include but is not limited to: news, articles, blogs, information about various government institutions, information about points of interest, thematically clustered digital content (such as digital content relevant to those interested in kick-boxing), and the like.

It should be noted that "text-based" digital content does not intend to mean that the given digital document only contains text to the exclusion of other type of multi-media elements. On the contrary, the given text-based digital document may include text elements, as well as potentially other type of multi-media elements. For instance, a given text-based digital document that is an article may include text, as well as photos. As another example, a given text-based digital document that is a blog may include text, as well as embedded video elements.

It should be noted digital content of a given network resource may be published by a publishing entity, or simply a "publisher". Generally speaking, a given publisher generates digital content and publishes it such that its digital content becomes available on a given network resource. It should be noted that a given publisher usually generates and publishes digital content having a common type and/or common topic. For example, a given publisher that usually publishes digital content related to sport news, is likely to publish new digital content also related to sport news.

It is contemplated that in some embodiments of the present technology, a given one of the plurality of network resources 130 may be associated with one or more publishers. In other embodiments of the present technology, a given publisher may be associated with one or more of the plurality of network resources 130, without departing from the scope of the present technology.

Generally speaking, digital content is potentially "discoverable" by the electronic device 104 via various means. For example, the user 102 of the electronic device 104 may use a browser application (not depicted) and enter a Universal Resource Locator (URL) associated with the given one of the first network resource 132, the second network resource 134 and the plurality of additional network resources 136. In another example, the user 102 of the electronic device 104 may execute a search using a search engine (not depicted) to discover digital content of one or more of the first network resource 132, the second network resource 134 and the plurality of additional network resources 136. As has been mentioned above, these are useful when the user 102 knows a priori which digital content the user 102 is interested in.

Recommendation Server

The server 112 may be implemented as a conventional computer server. In an example of an embodiment of the present technology, the server 112 may be implemented as a Dell™ PowerEdge™ Server running the Microsoft™ Windows Server™ operating system. Needless to say, the server 112 may be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

Generally speaking, the server 112 is configured to (i) receive from the electronic device 104 the request 150 for digital content recommendation and (ii) responsive to the request 150, generate a recommended digital content message 152 to be transmitted to the electronic device 104.

It is contemplated that at least some of digital content in the recommended digital content message 152 may be specifically generated or otherwise customized for the user 102 associated with the electronic device 104. As part of digital content in the recommended digital content message 152, the server 112 may be configured to provide inter alia information indicative of the recommended digital content set 214 to the electronic device 104 for display to the user 102 (on the recommendation interface 108 of the recommendation application 106).

It should be understood that the recommended digital content set 214 provided to the user 102 by the server 112 may comprise given digital content that is available at one of the plurality of network resources 130, without the user 102 knowing a priori about the given digital content. How the recommended digital content set 214 is generated by the server 112 will be described in greater detail herein further below.

Figure 3:
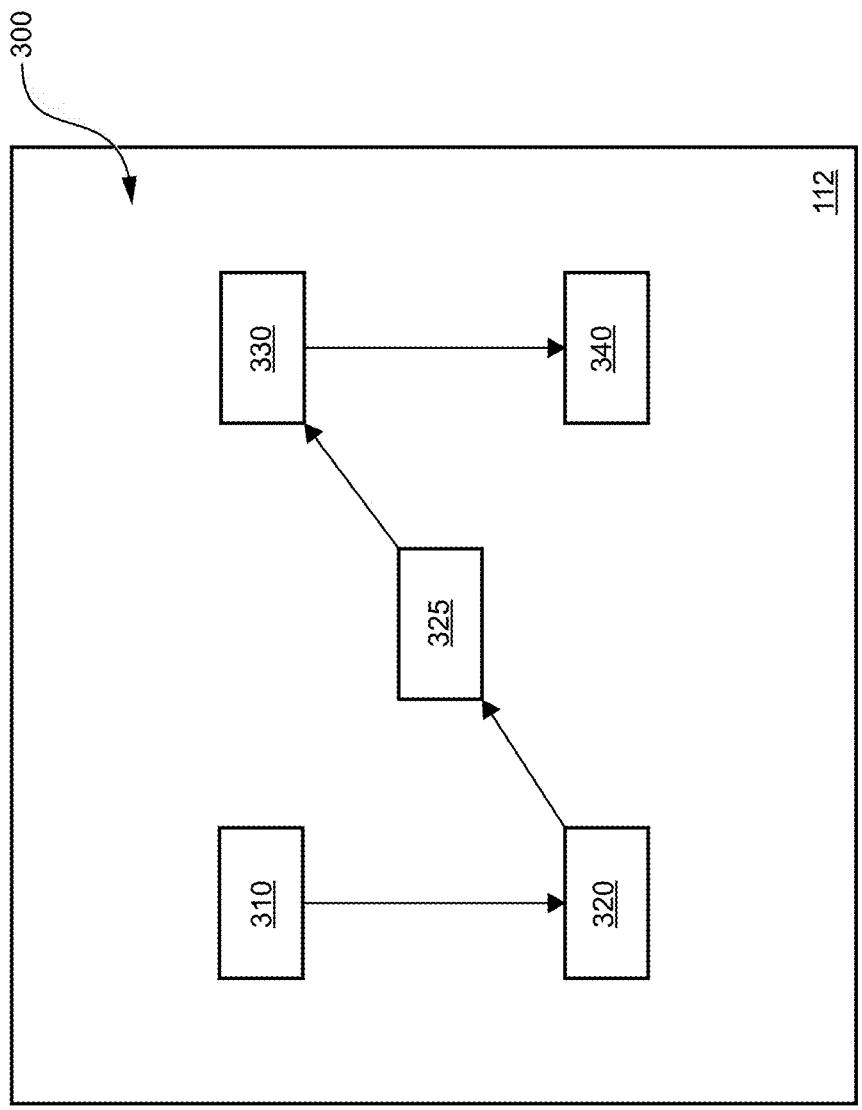
FIG. 3 depicts a plurality of computer-implemented procedures executable by the server of FIG. 1 in accordance with non-limiting embodiments of the present technology.

With reference to FIG. 3, the server 112 may be configured to execute at least some of a plurality of computer-implemented procedures 300 for providing digital content recommendation to the user 102. It is contemplated that other computer-implemented procedures to those non-exhaustively depicted in FIG. 3 may be implemented by the server 112 for providing digital content recommendation to users, without departing from the scope of the present technology.

The plurality of computer-implemented procedures 300 includes (i) a digital content discovery procedure 310, (ii) an interaction data gathering procedure 320, (iii) an interaction data estimation procedure 325, (iv) a digital content pre-selection procedure 330, and (v) a digital content selection procedure 340, which will now be described in turn.

Generally speaking, the digital content discovery procedure 310 is executed by the server 112 in order to discover and store potentially recommendable digital content for the plurality of users of the recommendation service of the system 100.

For example, as part of the digital content discovery procedure 310, the server 112 may be configured to execute a "crawler" application that "visits" network resources (such as the plurality of network resources 130) and catalogues one or more digital documents hosted by respective network resources.

The nature of digital content that is potentially recommendable by the server 112 is not particularly limited. Some examples of digital content that is potentially recommendable by the server 112 include, but are not limited to, digital documents such as:
- a news article;
- a publication;
- a web page;
- a post on a social media web site;
- a new application to be downloaded from an app store;
- a new song (music track) to play/download from a given network resource;
- an audiobook to play/download from a given network resource;
- a podcast to play/download from a given network resource;
- a new movie (video clip) to play/download from a given network resource;
- a product to be bought from a given network resource; and
- a new digital document uploaded for viewing on a social media web site (such as a new photo uploaded to an INSTRAGRAM™ or FACEBOOK™ account).

It is also contemplated that, as part of the digital content discovery procedure 310, the server 112 may be configured to populate a digital content database 120 with information about the so-discovered and catalogued digital documents for future use.

Generally speaking, the interaction data gathering procedure 320 may be executed by the server 112 in order to gather and store user-item interaction data between users of the recommendation service and digital content items. It is contemplated that user-item interaction data may be used by the server 112 for recommending digital content to users of the recommendation service.

As it will become apparent from the description below, a given digital content item may be one of: a given digital document, a given network resource hosting digital documents and a given publisher publishing digital documents.

The server 112 may track and gather user-item interaction data of users of the system 100 with digital content items based on digital content that has been previously recommended to the respective users.

For example, let it be assumed that a given user interacted with a given digital content item being a given digital document previously recommended thereto via the recommendation service. As such, the server 112 may track and gather user-item interaction data of the given user with the given digital document in a form of user events that occurred between the given user and the given digital document.

It should be noted that, in this example, the server 112 may be configured to track and gather user-item interaction data of the given user at a "digital document level", where a given digital content item is a given digital document (as opposed to being a given network resource or a given publisher).

Examples of different types of user events that may be tracked and gathered by the server 112 at the digital document level include, but are not limited to:
- the given user "scrolled over" the given digital document;
- the given user "liked" the given digital document;
- the given user "disliked" the given digital document;
- the given user "shared" the given digital document;
- the given user "clicked" or "selected" the given digital document;
- the given user spent an amount of "interaction time" consulting the given digital document; and
- the given user purchased/ordered/downloaded the given digital document.

It is contemplated that, as part of the interaction data gathering procedure 320, the server 112 may be configured to populate a user database 122 with so-tracked and gathered user-item interaction data in association with respective users.

It should be understood that, the given user may have, for example, also interacted with another given digital document, and where both the given and the another given digital document are hosted by a common network resource. As such, it is contemplated that the server 112 may track and gather user-item interaction data of the given user with all digital documents hosted by the common network resource in a form of user events that occurred between the given user and digital content hosted by the common network resource.

Therefore, it should be noted that, additionally or optionally, the server 112 may be configured to track, gather and store user-item interaction data of the given user at a "network resource level", where a given digital content item is a given network resource (as opposed to being a given digital document or a given publisher).

It should also be understood that, the given user may have, for example, also interacted with an additional given digital document, and where both the given and the additional given digital document have been generated and published by a common publisher. As such, it is contemplated that the server 112 may track and gather user-item interaction data of the given user with all digital documents published by the common publisher in a form of user events that occurred between the given user and digital content published by the common publisher.

Therefore, it should be noted that, additionally or optionally, the server 112 may be configured to track, gather and store user-item interaction data of the given user at a "publisher level", where a given digital content item is a given publisher (as opposed to being a given digital document or a given network resource).

Generally speaking, the interaction data estimation procedure 325 may be executed by the server 112 in order to estimate and potentially store user-item interaction data between users of the recommendation service and digital content items which has not been gathered by the server 112 as part of the interaction data gathering procedure 320. For example, the server 112 may not have tracked, gathered and stored some user-item interaction data simply because some users of the recommendation service have not previously interacted with some digital content items.

On the one hand, in the context of the present specification, a given "occurred user-item pair" corresponds to a respective pair having a given user and a given digital content item with which the given user has interacted. In other words, given occurred user-item pairs are user-item pairs which occurred, and for which the server 112 previously tracked, gathered and stored user-item interaction data as part of the interaction data gathering procedure 320.

On the other hand, in the context of the present specification, a given "non-occurred user-item pair" corresponds to a respective pair having a given user and a given digital content item with which the given user has not interacted. In other words, given non-occurred user-item pairs are user-item pairs which have not occurred, and for which the server 112 may be configured to estimate (i.e. predict) user-item interaction data as part of the interaction data estimation procedure 325.

As previously alluded to, the server 112 may be configured to store the estimated user-item interaction data in the user database 122 in association with respective non-occurred user-item pairs. How the server 112 is configured to execute the interaction data estimation procedure 325 will be described in greater detail herein below with reference to FIGS. 4 and 5.

Generally speaking, the digital content pre-selection procedure 330 may be executed by the server 112 in order to pre-select digital content items based on which digital content to be recommended to the user 102 may be further selected. It is contemplated that the digital content pre-selection procedure 330 may be executed such that the pre-selection of the digital content items is based on (i) user-item interaction data previously gathered as part of the interaction data gathering procedure 320 and (ii) user-item interaction data that is estimated by the server 112 as part of the interaction data estimation procedure 325.

In some embodiments of the present technology, it is contemplated that the server 112 may be configured to execute the digital content pre-selection procedure 330 such that digital content items are progressively pre-selected. In other words, as part of the digital content pre-selection procedure 330, the server 112 may perform more than one rounds of pre-selection of digital content items based on which digital content to be recommended to the user 102 may be further selected. To that end, as part of the digital content pre-selection procedure 330, the server 112 may execute more than one pre-selection sub-procedures in order to perform more than one respective rounds of pre-election of digital content items.

It is contemplated that the server 112 may be configured to store pre-selected digital content items in the digital content database 120. How the server 112 is configured to execute the digital content pre-selection procedure 330 will be described in greater detail herein below with reference to FIGS. 7 and 8.

Generally speaking, the digital content selection procedure 340 may be executed by the server 112 in order to select digital content to be recommended to the user 102. For example, the digital content selection procedure 340 may be executed by the server 112 in order to select at least some digital content to be included in the recommended digital content set 214 (see FIG. 2) provided to the user 102 via the recommended digital content message 152 in response to the request 150 (see FIG. 1).

It is contemplated that the server 112 may be configured to execute the digital content selection procedure 340 based on the pre-selected digital content items determined in response to the execution of the digital content pre-selection procedure 330, without departing from the scope of the present technology.

It is contemplated that the server 112 may be configured to store selected digital content to be recommended to the user 102 in the digital content database 120. How the server 112 may be configured to execute the digital content selection procedure 340 will be described in greater detail herein below.

It is contemplated that, in order to execute at least some of the plurality of computer-implemented procedures 300 (such as for example the interaction data estimation procedure 325, the digital content pre-selection procedure 330, and the digital content selection procedure 340) the server 112 may implement one or more Machine Learning Algorithms (MLAs).

Machine Learning Algorithms

Generally speaking, the MLAs can learn from and make predictions on data. The MLAs are usually used to first build a model based on training inputs of data in order to then make data-driven predictions or decisions expressed as outputs, rather than following static computer-readable instructions. The MLAs are commonly used as estimation models, ranking models, classification models and the like.

It should be understood that different types of the MLAs having different structures or topologies may be used for various tasks.

One particular type of MLAs includes neural networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers and in data estimation, data processing, including filtering, clustering, vector embedding and the like.

To summarize, the implementation of a given MLA by the server 112 can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

It is contemplated that, in some embodiments of the present technology, in order to execute the at least some of the plurality of computer-implemented procedures 300, the server 112 may be configured to implement one or more MLAs that can be one or more suitable supervised, semi-supervised and unsupervised MLAs.

Data Storage Device

Returning to the description of FIG. 1, the server 112 is communicatively coupled to a data storage device 118. The data storage device 118 is depicted as a separate entity from the server 112. However, it is contemplated that the data storage device 118 may be implemented integrally with the server 112, without departing from the scope of the present technology. Alternatively, functionalities of the data storage device 118 as described below may be distributed between more than one storage device.

Generally speaking, the data storage device 118 is configured to store data generated, retrieved and/or processed by the server 112 for temporary and/or permanent storage thereof. For example, the data storage device 118 may be configured to store inter alia data resulting from the execution of the at least some of the plurality of computer-implemented procedures 300.

The data storage device 118 includes the digital content database 120. As mentioned above, the digital content database 120 may be populated by the server 112. The digital content database 120 stores, for instance, information about digital content discovered and catalogued by the server 112. The digital content database 120 may store, in another instance, information about respective digital documents that are potentially recommendable by the server 112 to users of the recommendation service.

In some embodiments, the digital content database 120 may further store information about network resources of at least some digital documents that are potentially recommendable by the server 112. For example, the server 112 may be configured to populate the digital content database 120 with digital documents in association with respective network resources.

In other embodiments, the digital content database 120 may further store information about respective publishers of at least some digital documents that are potentially recommendable by the server 112. For example, the server 112 may be configured to populate the digital content database 120 with digital documents in association with respective publishers.

Additionally or optionally, it is contemplated that the server 112 may be configured to populate the digital content database 120 with digital documents in association with respective network resources and in association with respective publishers, without departing from the scope of the present technology.

As previously mentioned, the digital content database 120 may also store information about pre-selected digital content having been pre-selected as part of the digital content pre-selection procedure 330 and/or information about selected digital content having been selected as part of the digital content selection procedure 340, without departing from the scope of the present technology.

In additional embodiments of the present technology, the digital content database 120 may be populated with additional information about the digital content potentially recommendable by the recommendation service.

For example, the server 112 may collect information about a general popularity of given digital content amongst users of the recommendation service (fin case of given digital content being a music track, how many times the given music track has been listened to/downloaded).

In another example, the server 112 may collect information about digital content-inherent characteristics (in case of given digital content being a music track—length of the track, the genre of the track, audio-characteristic of the track; other digital content-inherent characteristics include: the price of the given digital content, the category of the given digital content, the length measured in words or symbols of the given digital content).

Figure 6:
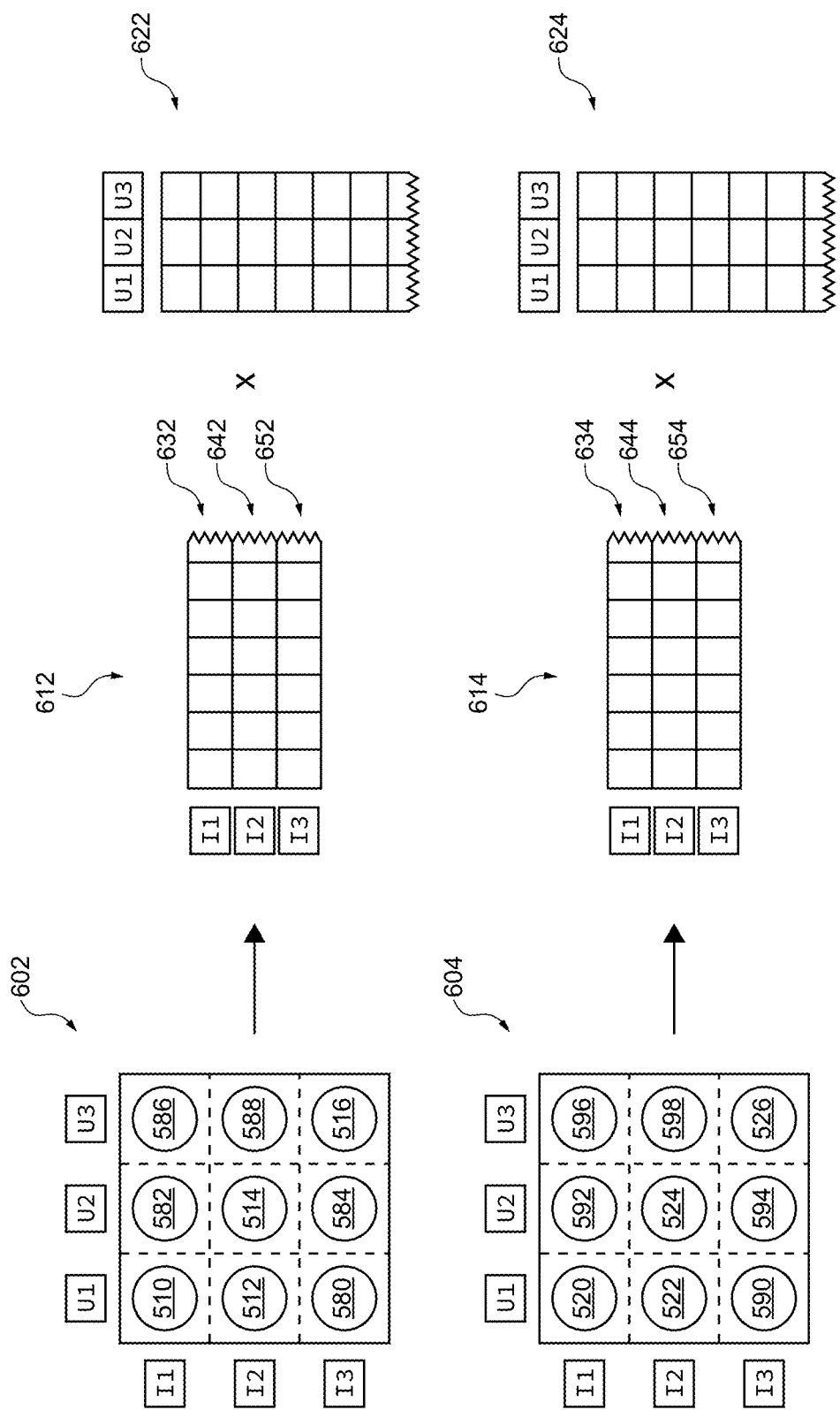
FIG. 6 depicts a first user-item matrix with user-item interaction data of the first type and a second user-item matrix with user-item interaction data of the second type and which are processed by the server of FIG. 1 for generating respective first and second sets of item features for digital content items in accordance with non-limiting embodiments of the present technology.

In yet another example, as it will be described in greater detail herein further below with reference to FIG. 6, the server 112 may generate and store in the digital content database 120 first and second sets of item features in association with respective digital content items for further use during the digital content pre-selection procedure 330. Other information about the digital content may also be stored in the digital content database 120 without departing from the scope of the present technology.

The data storage device 118 also includes the user database 122. The user database 122 stores information about user-item interactions of the recommendation service of the system 100 (such as the user 102 and other potential users, for example). As mentioned above, the user database 122 may be populated by the server 112.

In some embodiments, the user database 122 may be populated with user-item interaction data tracked and gathered by the server 112 during the execution of the interaction data gathering procedure 320. In other words, the user database 122 may be populated with user-item interaction data in association with the respective occurred user-item pairs.

In other embodiments, it is contemplated that the user database 122 may be further populated with user-item interaction data estimated by the server 112. In other words, once user-item interaction data for non-occurred user-item pairs is estimated as a result of the execution of the interaction data estimation procedure 325, the user database 122 may be further populated with the estimated user-item interaction data in association with the respective non-occurred user-item pairs.

It should be understood that the user database 122 may be populated with user-item interaction data at different digital content item levels. For example, as previously alluded to, the user database 122 may be populated with user-item interaction data on the digital document level and/or on the network resource level and/or on the publisher level, without departing from the scope of the present technology. Also, as previously mentioned, the user database 122 may be populated with user-item interaction data of a given user with a given digital content item in a form of user events that occurred (and/or that have not occurred but are estimated) between the given user and the given digital content item.

It is contemplated that in some embodiments of the present technology, user-item interaction data may be classified in the user database 122 by respective types of user-item interaction data. In some embodiments, types of user-item interaction data may correspond to types of users events that occurred (and/or that have not occurred but are estimated) between users and digital content items.

For example, a first type of user-item interaction data may be a number of "clicks", a second type of user-item interaction data may be a number of "likes", while a third type of user-item interaction data may by an amount of "interaction time". It should be noted that user-item interaction data may be classified in the user database 122 based on respective types of user-item interaction data which are additional and/or different from those non-exhaustively listed above, and without departing from the scope of the present technology.

In additional embodiments of the present technology, the user database 122 may be populated with additional information about the plurality of users of the recommendation service. For example, the server 112 may be configured to collect and store in the user database 122 user-profile data associated with the plurality of users of the system 100 such as, but not limited to: name, age, gender, user-selected types of digital content that (s)he desires, and the like. Other information about the plurality of users of the recommendation service may also be stored in the user database 122.

How the interaction data estimation procedure 325 is executed will now be described in greater detail with reference to FIGS. 4 and 5.

Figure 4:
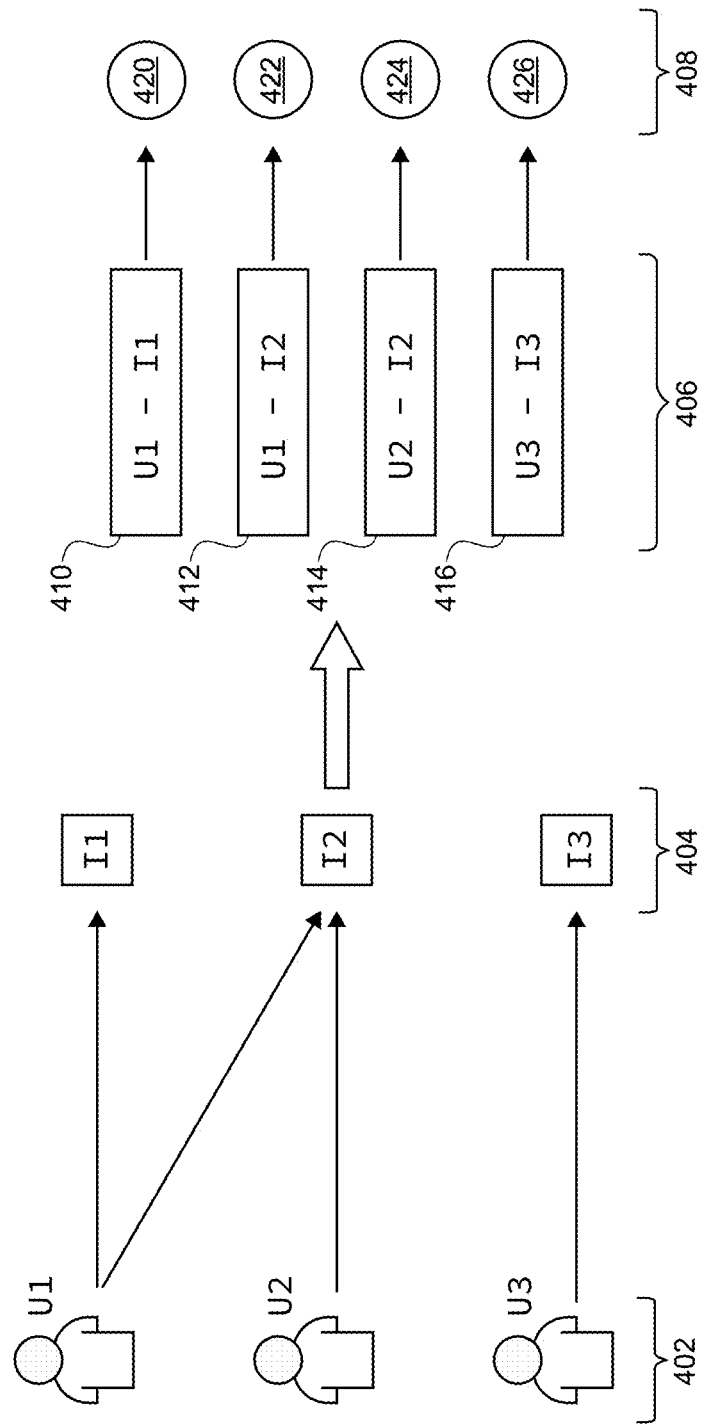
FIG. 4 depicts at least some users and at least some digital content items of the system of FIG. 1 and at least some occurred user-item pairs in accordance with non-limiting embodiments of the present technology.

In FIG. 4, there is depicted a plurality of users 402 comprising a first user U1, a second user U2 and a third user U3. It should be understood that the plurality of users 402 comprises at least some users of the plurality of users of the recommendation system 100. The plurality of users 402 is illustrated as having three users but, in other embodiments of the present technology, the plurality of users 402 may comprise any number of users of the plurality of users of the recommendation system 100 without departing from the scope of the present technology.

There is also depicted a plurality of digital content items 404 comprising a first digital content item I1, a second digital content item I2 and a third digital content item I3. It should be understood that the plurality of digital content items 404 comprises at least some digital content items of the plurality of digital content items of the recommendation system 100. The plurality of digital content items 404 is illustrated as having three digital content items but, in other embodiments of the present technology, the plurality of digital content items 404 may comprise any number of digital content items of the plurality of digital content items of the recommendation system 100 without departing from the scope of the present technology.

As illustrated in FIG. 4 via arrows, let it be assumed that the first user U1 has interacted with the first and the second digital content items I1 and I2. Let it also be assumed that the second user U2 has interacted with the second digital content item I2 and the third user U3 has interacted with the third digital content item I3.

It should be understood that, as part of the interaction data gathering procedure 320, the server 112 may be configured to track, gather and store, in the user database 122, a set of user-item interaction data 408 comprising user-item interaction data associated with respective ones of a plurality of occurred user-item pairs 406. More specifically, the server 112 may store: user-item interaction data 420 in association with a user-item pair 410 (e.g., occurred U1-I1 pair), user-item interaction data 422 in association with a user-item pair 412 (e.g., occurred U1-I2 pair), user-item interaction data 424 in association with a user-item pair 414 (e.g., occurred U2-I2 pair) and user-item interaction data 426 in association with a user-item pair 416 (e.g., occurred U3-I3 pair).

It should be understood that in the non-limiting example of FIG. 4, some possible user-item pairs have not occurred since not all of the plurality of users 402 have interacted with each and every of the plurality of digital content items 404. For example, the first user U1 has not interacted with the third digital content item I3 and, therefore, U1-I3 pair is a non-occurred user-item pair. Also, the second user U2 has not interacted with the first and third digital content items I1 and I3 and, therefore, U2-I1 pair and U2-I3 pair are non-occurred user-item pairs. Furthermore, the third user U3 has not interacted with the first and second digital content items I1 and I2 and, therefore, U3-I1 pair and U3-I2 pair are non-occurred user-item pairs.

It is contemplated that user-item interaction data between users and digital content items of the recommendation service is instrumental for the server 112 in recommending digital content to users of the recommendation service. As such, in some embodiments of the present technology, the server 112 may be configured to execute the interaction data estimation procedure 325 for estimating user-item interaction data for the non-occurred user-item pairs.

Without wishing to be bound to any specific theory, developers of the present technology determined that, at least in some cases, estimating different types of user-item interaction data independently from one another for non-occurred user-item pairs may result in a more accurate estimation of user-item interaction data as a whole for a given non-occurred user-item pair, if compared to an estimation of user-item interaction data of different types all at once.

Figure 5:
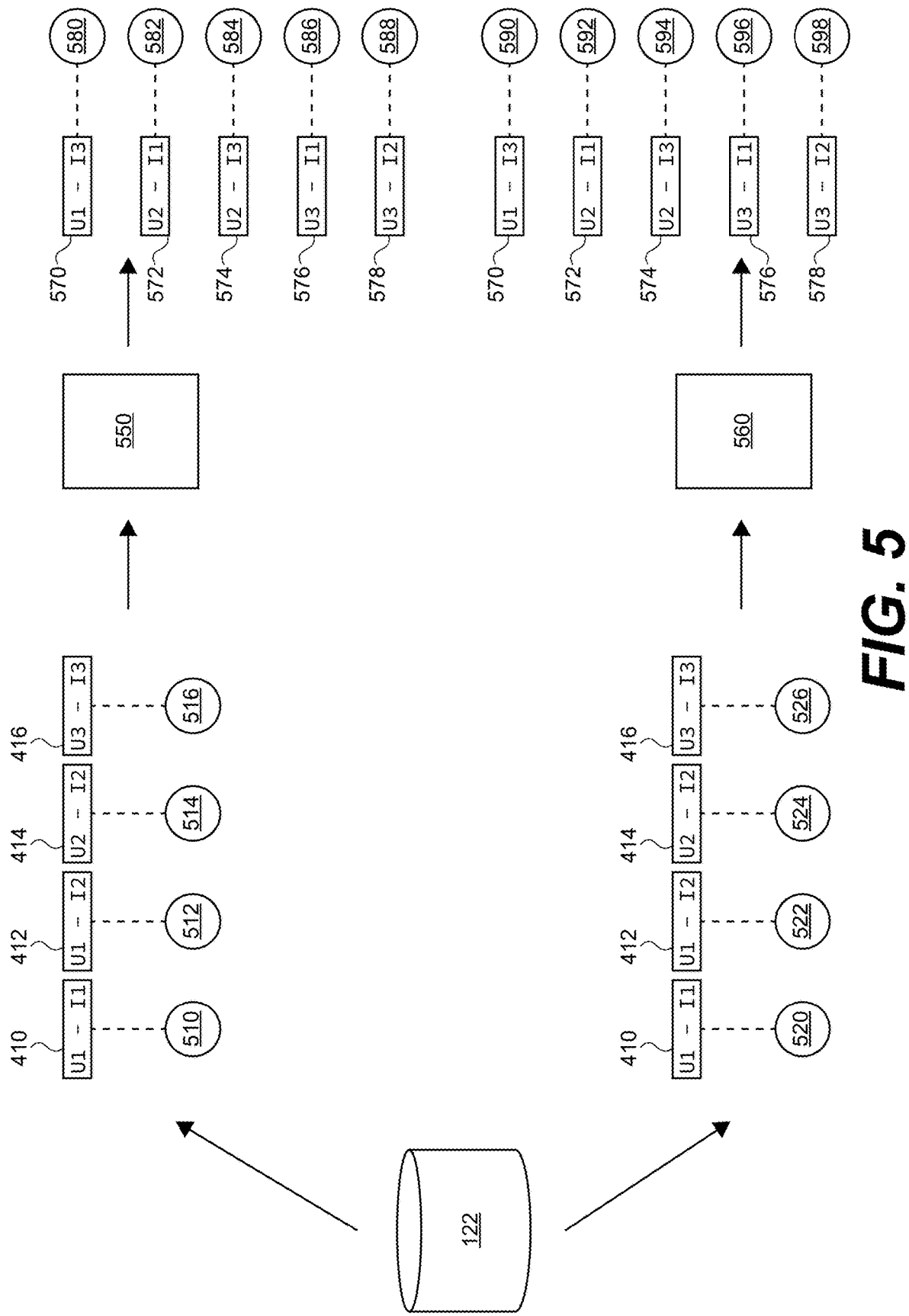
FIG. 5 depicts a process for retrieval of a first type of user-item interaction data and of a second type of user-item interaction data by the server of FIG. 1 for the occurred user-item pairs of FIG. 4 for estimation of user-item interaction data of the first type and of the second type for non-occurred user-item pairs in accordance with non-limiting embodiments of the present technology.

With reference to FIG. 5, as part of the interaction data estimation procedure 325, the server 112 is configured to retrieve from the user database 122, user-item interaction data of a first type for each occurred user-item pair and user-item interaction data of a second type for each occurred user-item pair. In this example, the server 112 retrieves, for each one of the plurality of occurred user-item pairs 406, user-item interaction data of the first type and of the second type. More specifically, the server 112 is configured to retrieve:
- user-item interaction data 510 and 520, being respectively of the first and the second type, for the occurred user-item pair 410 U1-I1;
- user-item interaction data 512 and 522, being respectively of the first and the second type, for the occurred user-item pair 412 U1-I2;
- user-item interaction data 514 and 524, being respectively of the first and the second type, for the occurred user-item pair 414 U2-I2; and
- user-item interaction data 516 and 526, being respectively of the first and the second type, for the occurred user-item pair 416 U3-I3.

It should be noted that the user-item interaction data 510 and 520 are respective sub-sets of user-item interaction data from the user-item interaction data 420 and where the user-item interaction data 510 and 520 are of distinct types of interaction data. Also, the user-item interaction data 512 and 522 are respective sub-sets of user-item interaction data from the user-item interaction data 422 and where the user-item interaction data 512 and 522 are of distinct types of interaction data. Further, the user-item interaction data 514 and 524 are respective sub-sets of user-item interaction data from the user-item interaction data 424 and where the user-item interaction data 514 and 524 are of distinct types of interaction data. Moreover, the user-item interaction data 516 and 526 are respective sub-sets of user-item interaction data from the user-item interaction data 426 and where the user-item interaction data 516 and 526 are of distinct types of interaction data.

On the one hand, the server 112 is also configured to apply a first estimation model 550 to the user-item interaction data 510, 512, 514 and 516 of the first type associated with the respective occurred user-item pairs, thereby being configured to estimate user-item interaction data of the first type for non-occurred user item pairs of the recommendation system 100. For example, by applying the first estimation model 550 on user-item interaction data 510, 512, 514 and 516 of the first type, the server 112 is configured to estimate:
- user-item interaction data 580 being of the first type for a non-occurred user-item pair 570 U1-I3;
- user-item interaction data 582 being of the first type for a non-occurred user-item pair 572 U2-I1;
- user-item interaction data 584 being of the first type for a non-occurred user-item pair 574 U2-I3;
- user-item interaction data 586 being of the first type for a non-occurred user-item pair 576 U3-I1; and
- user-item interaction data 588 being of the first type for a non-occurred user-item pair 578 U3-I2.

On the other hand, the server 112 is configured to apply a second estimation model 560 to the user-item interaction data 520, 522, 524 and 526 of the second type associated with respective occurred user-item pairs, thereby being configured to estimate user-item interaction data of the second type for non-occurred user item pairs of the recommendation system 100. For example, by applying the second estimation model 560 on user-item interaction data 520, 522, 524 and 526 of the second type, the server 112 is configured to estimate:
- user-item interaction data 590 being of the second type for the non-occurred user-item pair 570 U1-I3;
- user-item interaction data 592 being of the second type for the non-occurred user-item pair 572 U2-I1;
- user-item interaction data 594 being of the second type for the non-occurred user-item pair 574 U2-I3;
- user-item interaction data 596 being of the second type for the non-occurred user-item pair 576 U3-I1; and
- user-item interaction data 598 being of the second type for the non-occurred user-item pair 578 U3-I2.

In some embodiments of the present technology, the application of the first estimation model 550 is executed by the server 112 independently from the second estimation model 560. In other words, it is contemplated that, in order to estimate the user-item interaction data of the first type 580, 582, 584, 586 and 588, the server 112 may not require or use the user-item interaction data of the second type 520, 522, 524 and 526. By the same token, this means that, in order to estimate the user-item interaction data of the second type 590, 592, 594, 596 and 598, the server 112 may not require or use the user-item interaction data of the first type 510, 512, 514 and 516.

In other embodiments of the present technology, the server 112 may be configured to (i) apply the first estimation model 550 on the user-item interaction data of the first type 510, 512, 514 and 516 and (ii) apply the second estimation model 560 on the user-item interaction data of the second type 520, 522, 524 and 526, at different moments in time in order to, respectively, estimate the user-item interaction data of the first type 580, 582, 584, 586 and 588 and the user-item interaction data of the second type 590, 592, 594, 596 and 598.

It should be understood that the way the server 112 estimates the user-item interaction data of the first type 580, 582, 584, 586 and 588 may depend inter alia on a type of the first estimation model 550. By the same token, the way the server 112 estimates the user-item interaction data of the second type 590, 592, 594, 596 and 598 may depend inter alia on a type of the second estimation model 560.

In some embodiments of the present technology, both the first estimation model 550 and the second estimation model 560 may be two distinct estimation models and still be of the same type of estimation model. For example, the first and the second estimation models may be respective Singular-Value Decomposition (SVD) models. How a given SVD-type model may be applied in order to (i) estimate the user-item interaction data of the first type 580, 582, 584, 586 and 588 based on the the user-item interaction data of the first type 510, 512, 514 and 516 and (ii) estimate the user-item interaction data of the second type 590, 592, 594, 596 and 598 based on the user-item interaction data of the second type 520, 522, 524 and 526 is generally described in US patent publication number 2018/0075137, entitled "METHOD AND APPARATUS FOR TRAINING A MACHINE LEARNING ALGORITHM (MLA) FOR GENERATING A CONTENT RECOMMENDATION IN A RECOMMENDATION SYSTEM AND METHOD AND APPARATUS FOR GENERATING THE RECOMMENDED CONTENT USING THE MLA, published on May 15, 2018; the content of which is incorporated herein by reference in its entirety and, therefore, will not be discussed in greater detail herein below.

In other embodiments of the present technology, the first estimation model 550 and the second estimation model 560 may be two distinct estimation models that are of different types of estimation models. For example, the first estimation model 550 may be a given SVD-type model while the second estimation model 560 may be a given NN-type estimation model. As previously alluded, the server 112 may be configured to implement a given NN in order to apply the second estimation model 560.

It is contemplated that the first estimation model 550 may be trained based on user-item interaction data of the first type while the second estimation model 560 may be trained on user-item interaction data of the second type. Therefore, in some embodiments, by training the first estimation model 550 based on user-item interaction data of the first type, the first estimation model 550 can be said to be specifically tailored for estimating user-item interaction data of the first type (as opposed to user-interaction data of another type). Also, in other embodiments, by training the second estimation model 560 based on user-item interaction data of the second type, the second estimation model 560 can be said to be specifically tailored for estimating user-item interaction data of the second type (as opposed to user-interaction data of another type).

In some embodiments of the present technology, as part of the interaction data estimation procedure 325, the server 112 may be configured to store in the user database 122:
- the user-item interaction data of the first type 580 and of the second type 590 in association with the non-occurred user-item pair 570 U1-I3;
- the user-item interaction data of the first type 582 and of the second type 592 in association with the non-occurred user-item pair 572 U2-I1;
- the user-item interaction data of the first type 584 and of the second type 594 in association with the non-occurred user-item pair 574 U2-I3;
- the user-item interaction data of the first type 586 and of the second type 596 in association with the non-occurred user-item pair 576 U3-I1; and
- the user-item interaction data of the first type 588 and of the second type 598 in association with the non-occurred user-item pair 578 U3-I2.

As a result, the user database 122 may store, for each possible user-item pair amongst the plurality of users 402 and the plurality of digital content items 404, respective user-item interaction data of the first and of the second type which is either (i) gathered by the server 112 via the interaction data gathering procedure 320 (e.g., associated with the respective occurred user-item pairs) or (ii) estimated by the server 112 via the interaction data estimation procedure 325 (e.g., associated with the respective non-occurred user-item pairs).

It is contemplated that the server 112 may be configured to generate recommended digital content for the user 102 at least partially based on the user-item interaction data of the first and of the second type which has been gather and/or estimated by the server 112 as explained above.

In some embodiments of the present technology, the server 112 may also be configured to generate a given first set of item features and a given second set of item features for each one of the plurality of digital content items 404. To that end, the server 112 may use a first user-item matrix 602 and a second user-item matrix 604, for example, depicted in FIG. 6.

The first user-item matrix 602 may comprise user-item interaction data of the first type for each possible user-item pair amongst the plurality of users 402 and the plurality of digital content items 404. The second user-item matrix 604 may comprise user-item interaction data of the second type for each possible user-item pair amongst the plurality of users 402 and the plurality of digital content items 404.

Again, it should be noted that, in both the first and the second user-item matrices 602 and 604, at least some user-item interaction data of the first and of the second type, respectively, are estimated by the server 112 for non-occurred user-item pairs of the recommendation system 100.

It is contemplated that at least in some embodiments of the present technology, user-item interaction data of the first type for each possible user-item pair amongst the plurality of users 402 and the plurality of digital content items 404 may be stored in the user database 122 in a form of the first user-item matrix 602. Similarly, at least in some embodiments of the present technology, user-item interaction data of the second type for each possible user-item pair amongst the plurality of users 402 and the plurality of digital content items 404 may be stored in the user database 122 in a form of the second user-item matrix 604.

It is also contemplated that the first and the second user-item matrices 602 and 604 may be stored separately and independently from each other in the user database 122 by the server 112.

For example, the server 112 may apply the first estimation model 550 and the second estimation model 560 separately and independently from each other and, therefore, the first and the second user-item matrices 602 and 604, which comprise at least some user-item interaction data that has been estimated via the respective first and second estimation models 550 and 560, respectively, may be stored in the user database 122 following the respective application of the first and the second estimation models 550 and 560.

In some embodiments of the present technology, in order to determine respective first and second sets of item features of each one of the plurality of digital content items 404 based on the first and the second user-item matrices 602 and 604, respectively, the server 112 may be configured to execute an Alternating Least Square (ALS) algorithm.

The ALS algorithm may be executed by the server 112 in order to determine (i) a first item matrix 612 and a first user matrix 622 based on the first user-item matrix 602 and (ii) a second item matrix 614 and a second user matrix 624 the second user-item matrix 604. How the ALS algorithm may be implemented by the server 112 is disclosed in the US patent publication number 2018/0075137, entitled "METHOD AND APPARATUS FOR TRAINING A MACHINE LEARNING ALGORITHM (MLA) FOR GENERATING A CONTENT RECOMMENDATION IN A RECOMMENDATION SYSTEM AND METHOD AND APPARATUS FOR GENERATING THE RECOMMENDED CONTENT USING THE MLA, published on May 15, 2018; the content of which is incorporated by reference in its entirety and, therefore, will now be discussed in greater detail herein below.

It is contemplated that item matrices 612 and 614 are representative of item features of the plurality of digital content items 404, while the first and the second user matrices 622 and 624 are representative of user features of the plurality of users 402. Without wishing to be bound to any specific theory, it should be understood that item features of digital content items are slower to change when compared with the user features of users. Indeed, user features may depend on inter alia digital content preferences of users which change with time, while item features depend on inter alia digital content of respective digital content items which is less likely to change with time.

Therefore, it is contemplated that the server 112 may be configured to store the first and the second item matrices 612 and 614 in order to use the information within later in time since its not likely to change, while not being configured to store the first and the second user matrices 622 and 624 since the information within is likely to change later in time. The first and the second item matrices 612 and 614, resulting from the execution of the ALS algorithm by the server 112 on the respective first and second user-item matrices 602 and 604, respectively, and the information contained within will now be discussed in greater detail.

Each row of the first and the second item matrices 612 and 614 is associated with a respective one of the plurality of digital content items 404. For example, a first row of the first item matrix 612 and a first row of the second item matrix 614 are associated with the first digital content item I1, a second row of the first item matrix 612 and a second row of the second item matrix 614 are associated with the second digital content item I2 and a third row of the first item matrix 612 and a third row of the second item matrix 614 are associated with the third digital content item I3.

At the same time it can be said that each row of the first item matrix 612 is representative of item features (i) of the respective digital content items and (ii) which are at least partially based on user-item interaction data of the first type (some having been gathered while other having been estimated as explained above) between the plurality of users 402 and the plurality of digital content items 404. For example, the first row of the first item matrix 612 is representative of a first set of item features (e.g., item vector 632) of the first digital content item I1, and where the first set of item features is generated based on user-item interaction data of the first type associated with each possible pair amongst the plurality of users 402 and the plurality of digital content items 404. Similarly, the second row of the first item matrix 612 is representative of a first set of item features (e.g., item vector 642) of the second digital content item I2 and the third row of the first item matrix 612 is representative of a first set of item features (e.g., item vector 652) of the digital content item I3.

It is contemplated that, by executing the ALS algorithm based on the first user-item matrix 602, the server 112 generates the first item matrix 612 such that digital content items having similar digital content have similar first sets of item features.

By the same token, each row of the second item matrix 614 is representative of item features (i) of the respective digital content items and (ii) which are at least partially based on user-item interaction data of the second type (some having been gathered while other having been estimated as explained above) between the plurality of users 402 and the plurality of digital content items 404. For example, the first row of the second item matrix 614 is representative of a second set of item features (e.g., item vector 634) of the first digital content item I1, and where the second set of item features is generated based on user-item interaction data of the second type associated with each possible pair amongst the plurality of users 402 and the plurality of digital content items 404. Similarly, the second row of the second item matrix 614 is representative of a second set of item features (e.g., item vector 644) of the second digital content item I2 and the third row of the second item matrix 614 is representative of a second set of item features (e.g., item vector 654) of the third digital content item I3.

It is contemplated that, by executing the ALS algorithm based on the second user-item matrix 604, the server 112 generates the second item matrix 614 such that digital content items having similar digital content have similar second sets of item features.

As a result, it is contemplated that the server 112 may be configured to generate, for each one of the plurality of digital content items 404, a respective first set of item features based on user-item interaction data of the first type and a respective second set of item features based on user-item interaction data of the second type. As previously mentioned, it is also contemplated that the server 112 may be configured to store in the digital content database 120 each one of the plurality of digital content items 404 in association with respective first and second sets of item features for future use thereof.

As mentioned above, in some embodiments of the present technology, at least one of the first estimation model 550 and the second estimation model 560 may be a given NN-type estimation model (e.g., NN-based model). How the given NN-type estimation model may be implemented for estimating user-interaction data of a given type, in some embodiments of the present technology, will now be described.

The given NN-type estimation model may result from the training of a given NN. The given NN being trained may have two NN-portions. A first NN-portion may be dedicated for item data, while a second NN-portion may be dedicated for user data.

For example, let it be assumed that a given training iteration of the given NN is based on an occurred user-item pair and the respectively associated user-item interaction data of a given type (the given type of the user-interaction data may depend on which type of user-interaction data the given NN is being trained to estimate).

In some embodiments, item data for the given item of the occurred user-item pair may be determined. In some embodiments, at least some of the item data may be retrieved by the server 112 from the data storage device 118. For example, item data may comprise item-inherent characteristics of the given item, statistical information associated with words or text strings included in the given item (such as frequency of occurrence of a given word or a text string in the given item, for example), presence of multimedia content in the given item (such as presence of an image, for example), classification information associated with the given item, and the like. Other or additional types of item data may be used to those non-exhaustively listed above and may depend on inter alia different implementations of the present technology.

Once the item data for the given item is determined, the item data may be vectorized and inputted into the first NN-portion of the given NN. The first NN-portion is configured to generate an embedded representation of the item data. In other words, it can be said that the first NN-portion of the given NN is configured to generate an embedded item vector based on the vectorized item data inputted into the first NN-portion.

Similarly, user data for the given user of the occurred user-item pair may be determined. In some embodiments, at least some of the user data may be retrieved by the server 112 from the data storage device 118. For example, user data may comprise statistical information associated with the given user. In some cases, the statistical information may be extracted from the user-profile data stored in the data storage device 118. Other or additional types of user data may be used to those non-exhaustively listed above and may depend on inter alia different implementations of the present technology.

Once the user data for the given user is determined, the user data may be vectorized and inputted into the second NN-portion of the given NN. The second NN-portion is configured to generate an embedded representation of the user data. In other words, it can be said that the second NN-portion of the given NN is configured to generate an embedded user vector based on the vectorized user data inputted into the second NN-portion.

Recalling that the given occurred user-item pair is associated with user-item interaction data of a given type, the purpose of training the given NN is to condition the first NN-portion and the second NN-portion to generate the embedded item vector and the embedded user vector, respectively, such that a target level of similarity between the embedded item vector and the embedded user vector is based on the user-item interaction data of a given type associated with the given occurred user-item pair.

It should be noted that the target level of similarity between the embedded item vector and the embedded user vector that the given NN is conditioned to achieve during training may depend on inter alia different implementations of the present technology.

In one embodiment, if the user-item interaction data of the given type is indicative of that the given user has performed a large number of user-item interactions of the given type, the first NN-portion and the second NN-portion may be conditioned to generate the embedded item vector and the embedded user vector, respectively, such that a similarity value (e.g., vectorial distance) between the embedded item vector and the embedded user vector is maximized. If the user-item interaction data of the given type is indicative of that the given user has performed a small number of user-item interactions of the given type, the first NN-portion and the second NN-portion may be conditioned to generate the embedded item vector and the embedded user vector, respectively, such that the similarity value between the embedded item vector and the embedded user vector is minimized. In this embodiment, the target level of similarity between the embedded item vector and the embedded user vector that the given NN is conditioned to achieve during training is either (i) to maximize the similarity between the embedded item vector and the embedded user vector for positive training examples (e.g., where user-item interaction data of the given type of a given occurred user-item pair is indicative of the user in the given occurred user-item pair being satisfied with the item in the given occurred user-item pair), or (ii) to minimize the similarity between the embedded item vector and the embedded user vector for negative training examples (e.g., where user-item interaction data of the given type of a given occurred user-item pair is indicative of the user in the given occurred user-item pair not being satisfied with the item in the given occurred user-item pair).

This may be achieved by employing known NN adjustment techniques during training iterations of the given NN, such as back propagation techniques, for example, in order to "adjust" interconnections between neurons of the given NN in order to condition the first NN-portion and the second NN-portion as mentioned above.

In another embodiment, the first NN-portion and the second NN-portion may be conditioned to generate the embedded item vector and the embedded user vector, respectively, such that a similarity value between the embedded item vector and the embedded user vector reflects the user-item interaction data for the occurred user-item pair. In this embodiment, the target level of similarity between the embedded item vector and the embedded user vector that the given NN is conditioned to achieve during training is that the similarity value between the embedded item vector and the embedded user vector reflects the user-item interaction data of each training examples (e.g., user-item interaction data of each occurred user-item pair used during training). In other words, the target level of similarity reflects whether the user-item interaction data of the given type of a given occurred user-item pair is indicative of the user in the given occurred user-item pair being satisfied or not satisfied with the item in the given occurred user-item pair.

For example, if the user-item interaction data of the given type is indicative of that the given user has performed a given number of user-item interactions of the given type, the first NN-portion and the second NN-portion may be conditioned to generate the embedded item vector and the embedded user vector, respectively, such that the similarity value between the embedded item vector and the embedded user vector is as close as possible to the given number of user-item interactions of the given type. This also may be achieved by employing known NN adjustment techniques during training iterations of the given NN.

Once the first NN-portion and the second NN-portion of the given NN are conditioned as explained above, they may be used during the in-use phase. It should be noted that during training, the first NN-portion and the second NN-portion are trained together (e.g., simultaneously) based on occurred user-item pairs in association with the respective user-item interaction data of a given type. However, during in-use, the first NN-portion and the second NN-portion may be used separately (e.g., independently from one another) in order to estimate user-item interaction data of a given type for a given non-occurred user-item pair.

To better illustrate this, let it be assumed that the server 112 is configured to estimate user-item interaction data of a given type (same type of user-item interaction data as the type of user-item interaction data for which the given NN has been trained) for a given non-occurred user-item pair.

On the one hand, item data may be determined by the server 112 for the given item from the given non-occurred user-item pair, similarly to what has been described above. This item data may be vectorized and inputted into the now-trained first NN-portion for generating an in-use embedded item vector.

On the other hand, user data may be determined by the server 112 for the given user from the given non-occurred user-item pair, similarly to what has been described above. This user data may be vectorized and inputted into the now-trained second NN-portion for generating an in-use embedded user vector.

It is contemplated that in some embodiments of the present technology, the server 112 may be configured to estimate user-item interaction data of the given type for the given non-occurred user-item pair by computing the similarity value between the in-use embedded item vector and the in-use embedded user vector.

It should be noted that a given NN-based model may be trained for a respective type of user-item interaction data, without departing from the scope of the present technology. For example, an NN-based model may be trained for estimating a first type of user-item interaction data, while another NN-based model may be trained for estimating a second type of user-item interaction data. This means that, in some embodiments, (i) an SVD-based model may be used to estimate user-item interaction data of a first type, while a NN-based model may be used to estimate user-item interaction data of a second type, or (ii) a respective SVD-based model may be used to estimate user-item interaction data of the first type and of the second type, or (iii) a respective NN-based model may be used to estimate user-item interaction data of the first type and of the second type.

How the server 112 may be configured to execute the digital content pre-selection procedure 330 in some embodiments of the present technology will now be described in greater detail.

Returning to FIG. 1, let it be assumed that the user 102 is the second user U2 and that the server 112 receives from the electronic device 104 the request 150 for digital content recommendation for the second user U2. It should be noted that, at a moment in time when the server 112 receives from the electronic device 104, the server 112 may be considered to be operating in an online mode. In other words, before the receipt of the request 150, the server 112 may be considered to be operating in an offline mode relative to the request 150 from the second user U2. Therefore, it is contemplated that, at least some of the plurality of computer-implemented procedures 300 may be executed in the offline mode and hence decoupled from online processing, while others of the plurality of computer-implemented procedures 300 may be executed in the online mode.

As such, in the online mode, the server 112 may be configured to retrieve from the user database 122 (i) user-item interaction data of the first type and (ii) user-item interaction data of the second type for the occurred user-item pairs associated with the user 102 (e.g., the second user U2). As previously explained, in some embodiments of the present technology, the user-item interaction data of the first type and of the second type may be stored in the user database 122 in a form of user-item matrices.

Figure 7:
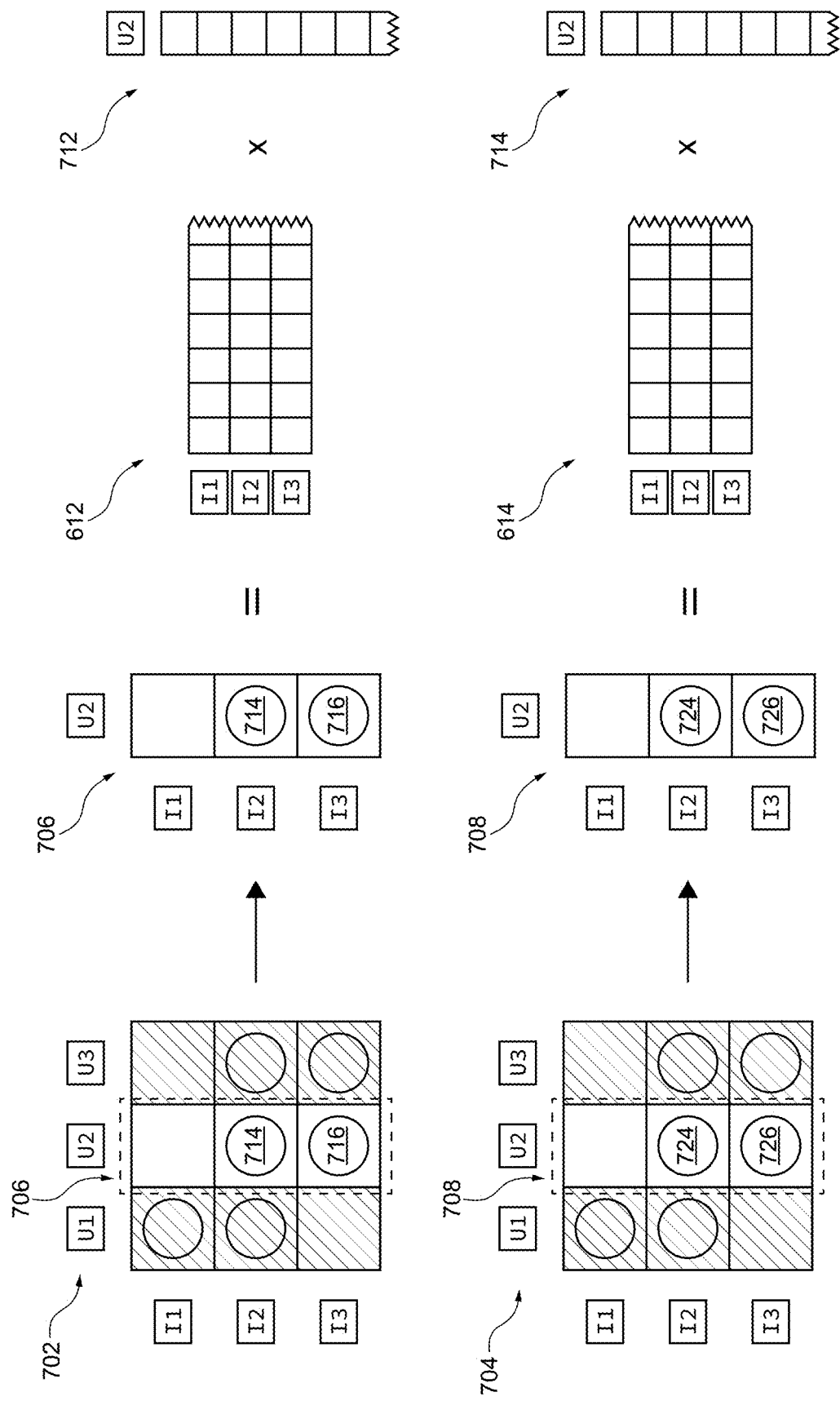
FIG. 7 depicts a process for generation of first and second sets of user features for a given user of the system of FIG. 1 in accordance with embodiments of the present technology.

With reference to FIG. 7, let it be assumed that, at the moment in time when the request 150 is received by the server 112, a third user-item matrix 702 comprising user-item interaction data of the first type and a fourth user-item matrix 704 comprising user-item interaction data of the second type are the current versions stored in user database 122. It should be understood that the contents of the third and the fourth user-item matrices 702 and 704 may be different (i.e. more "up to date") from the contents of the first and the second user-item matrices 602 and 604 depicted in FIG. 6.

As an example, the third and fourth user-item matrices 702 and 704 comprise user-item interaction data of only occurred user-item pairs. As another example, between a given moment in time when the first and the second user-item matrices 602 and 604 have been stored and the moment in time when the request 150 is received, users of the recommendation system 100 may have performed additional interaction with digital content items of the recommendation system 100 and, therefore, the user-item interaction data for the occurred user-item pairs in the third and the fourth user-item matrices 702 and 704 may be different (e.g., supplemented with more user-interaction data) from the user-item interaction data for the occurred user-item pairs in the first and the second user-item matrices 602 and 604.

As mentioned above, in the online mode, the server 112 may be configured to retrieve from the user database 122 (i) user-item interaction data of the first type and (ii) user-item interaction data of the second type for the occurred user-item pairs associated with the user 102 (e.g., the second user U2). This means that, in the non-limiting example of FIG. 7, the server 112 may be configured to retrieve a first user-item vector 706 and a second user-item vector 708 from the user database 122.

The first user-item vector 706 is a portion of the third user-item matrix 702 that is associated with the second user U2. It should be understood that the first user-item vector 706 comprises user-item interaction data of the first type associated with the user 102 (e.g., the second user U2) at the moment in time when the request 150 is received. The second user-item vector 706 is a portion of the fourth user-item matrix 704 that is associated with the second user U2. It should also be the second user-item vector 708 comprises user-item interaction data of the second type associated with the user 102 at the moment in time when the request 150 is received.

For illustration purposes only, the first user-item vector 706 comprises (i) user-item interaction data 714 of the first type associated with an occurred user-item pair U2-I2 and having been gathered by the server 112 before the moment in time when the request 150 is received, and (ii) user-item interaction data 716 of the first type associated with an occurred user-item pair U2-I3 and having been gathered by the server 112 before the moment in time when the request 150 is received.

Similarly, the second user-item vector 708 comprises (i) user-item interaction data 724 of the second type associated with the occurred user-item pair U2-I2 and having been gathered by the server 112 before the moment in time when the request 150 is received, and (ii) user-item interaction data 726 of the second type associated with the occurred user-item pair U2-I3 and having been gathered by the server 112 before the moment in time when the request 150 is received.

In this non-limiting example, let it be assumed that the user 102 (e.g., the second user U2) has not interacted with the first digital content item I1 before the moment in time when the request 150 is received. In other words, the U2-I1 pair is a given non-occurred user-item pair at the moment in time when the request 150 is received.

In some embodiments of the present technology, as part of the digital content pre-selection procedure 330, the server 112 may also retrieve from the digital content database 120 the first item matrix 612 and the second item matrix 614 being representative of the respective first and second sets of item features of the plurality of digital content items 404 as explained above.

It is contemplated that as part of the digital content pre-selection procedure 330, the server 112 may be configured to generate a first user vector 712 and a second user vector 714. In order to generate the first user vector 712, the server 112 may be configured to execute a single iteration of the ALS algorithm based on (i) the first user-item vector 706 and (ii) the first item matrix 612. This means that the server 112 may be configured to generate the first user vector 712 such that a matrix product of the first user vector 712 with the first item matrix 612 results in a given user-item vector that is similar to the first user-item vector 706. Similarly, the server 112 may be configured to generate the second user vector 714 such that a matrix product of the second user vector 714 with the second item matrix 614 results in a given user-item vector that is similar to the second user-item vector 708.

It should be noted that as a result of how the first and the second user vectors 712 and 714 are generated, if the digital content pre-selection procedure 330 is executed with another given user of the recommendation service that has similar digital content preferences to the user 102 (e.g., the second user U2), a given first and a given second user vector for the another given user may be similar to the first and the second user vector 712 and 714, respectively, of the user 102.

It should also be noted that the first user vector 712 comprises information about a first set of user features of the user 102 (e.g., the second user U2) which is generated based on user-item interaction data of the first type, while the second user vector 714 comprises information about a second set of user features of the user 102 (e.g., the second user U2) which is generated based on user-item interaction data of the second type.

Figure 8:
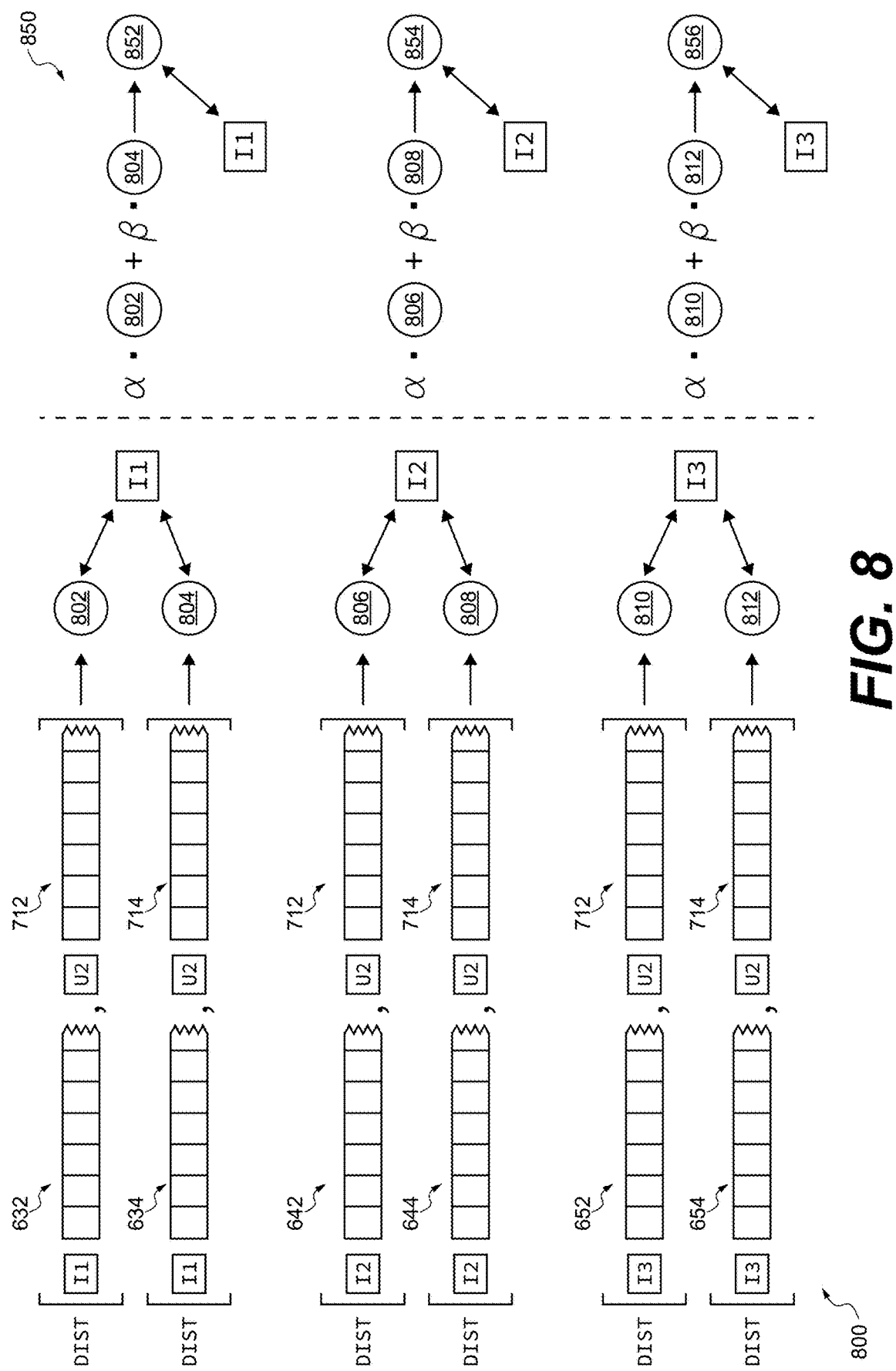
FIG. 8 depicts a process for generation of similarity scores and user-specific relevance values of digital content items for the given user of the system of FIG. 1 in accordance with embodiments of the present technology.

With reference to FIG. 8, in some embodiments of the present technology, as part of the digital content pre-selection procedure 330, the server 112 may be configured to execute (i) a similarity score generation procedure 800 and (ii) a user-specific relevance value generation procedure 850.

As part of the similarity score generation procedure 800, the server 112 may be configured to generate a respective plurality of similarity scores for each digital content item and where a given plurality of similarity scores comprises a number of similarity scores equal to a number of different types of user-item interaction data processed by the server 112. In the current example, since only the first type and the second type of user-item interaction data is processed by the server 112, the server 112 may be configured to generate two similarity scores for each digital content item amongst the plurality of digital content items 404.

For the first digital content item I1, the server 112 may be configured to generate similarity scores 802 and 804 by comparing, respectively, (i) the item vector 632 representative of the first set of item features of the first digital content item I1 with the first user vector 712 representative of the first set of user features of the user 102 (e.g., the second user U2) and (ii) the item vector 634 representative of the second set of item features of the first digital content item I1 with the second user vector 714 representative of the second set of user features of the user 102 (e.g., the second user U2).

For example, the similarity score 802 may be based on a vectorial distance between the item vector 632 and the first user vector 712, while the similarity score 804 may be based on a vectorial distance between the item vector 634 and the second user vector 714, such that the shorter the vectorial distance is between two given vectors, the higher the respective similarity score will be.

Similarly, for the second digital content item I2, the server 112 may be configured to generate similarity scores 806 and 808 by comparing, respectively, (i) the item vector 642 representative of the first set of item features of the second digital content item I2 with the first user vector 712 representative of the first set of user features of the user 102 (e.g., the second user U2) and (ii) the item vector 644 representative of the second set of item features of the second digital content item I2 with the second user vector 714 representative of the second set of user features of the user 102 (e.g., the second user U2). Also, for the third digital content item I3, the server 112 may be configured to generate similarity scores 810 and 812 by comparing, respectively, (i) the item vector 652 representative of the first set of item features of the third digital content item I3 with the first user vector 712 representative of the first set of user features of the user 102 (e.g., the second user U2) and (ii) the item vector 654 representative of the second set of item features of the third digital content item I3 with the second user vector 714 representative of the second set of user features of the user 102 (e.g., the second user U2).

In some embodiments of the present technology, as part of the user-specific relevance value generation procedure 850, the server 112 may be configured to generate, for digital content items, respective user-specific relevance values based on the respective similarity scores. For example, the server 112 may be configured to generate a user-specific relevance value 852 for the first digital content item I1 based on the similarity scores 802 and 804. Similarly, the server 112 may be configured to generate a user-specific relevance value 854 for the second digital content item I2 based on the similarity scores 806 and 808. Also, the server 112 may be configured to generate a user-specific relevance value 856 for the third digital content item I3 based on the similarity scores 810 and 812.

It should be noted that, in at least some embodiments of the present technology, a given user-specific relevance value of a given digital content item may be a weighted sum of respective similarity scores, as illustrated in the non-limiting example of FIG. 8.

In some embodiments, it is contemplated that weights used in the weighted sum of respective similarity scores may be generated once and for all users of the recommendation service and as such may be "user-non-specific" weights.

It is contemplated that the weights used in the weighted sum of respective similarity scores may be pre-determined or pre-assigned by the operator of the server 112. For example, the weights used in the weighted sum of respective similarity scores may be empirically pre-determined. In some cases, the weights used in the weighted sum of respective similarity scores may be pre-determined based on a statistical analysis of user logs of a number of users of the recommendation service. For example, the "user-non-specific" weights may be pre-determined such that the weighted sum of respective similarity scores reflects the relevance of the given digital content item as previously determined from the user logs of the number of users.

In other embodiments, it is contemplated that weights used in the weighted sum of respective similarity scores may be generated for each user of the recommendation service and as such may be "user-specific" weights.

It is contemplated that the weights used in the weighted sum of respective similarity scores may be pre-determined or pre-assigned on a user-by-user basis. In some cases, the weights used in the weighted sum of respective similarity scores may be pre-determined based on a statistical analysis of preferences of a specific user of the recommendation service in recommended content. For example, the "user-specific" weights may be pre-determined such that the weighted sum of respective similarity scores reflects the relevance of the given digital content item as previously determined based on the preferences of the specific user.

In some embodiments of the present technology, as part of the digital content pre-selection procedure 330, the server 112 may be configured to rank the plurality of digital content items 404 based on the respective user-specific relevance values, where a given digital content item with a topmost user-specific relevance score is a topmost ranked digital content item. For example, let it be assumed that the digital content item I2 is so-ranked first, the digital content item I1 is so-ranked second and the digital content item I3 is so-ranked third.

In some embodiments, as part of the digital content pre-selection procedure 330, the server 112 may be configured to apply a digital content item threshold in order to reduce a number of digital content items from which digital content may be recommended. The digital content item threshold may be indicative of a maximum number of digital content items from which digital content may be recommended.

For example, let it be assumed that the digital content item threshold is two digital content items. As a result, the server 112 may be configured to pre-select the digital content items I2 and I1 from which digital content may be recommended.

Now, let it be assumed that digital content items of the plurality of digital content items 404 are respective network resources of the plurality of network resources 130. In other words, let it be assumed that the digital content items I2 and I1 are respective network resources from which digital content may be recommended, such as for example the first and the second network resources 132 and 134, respectively.

In some embodiments of the present technology, as part of the digital content pre-selection procedure 330, the server 112 may be configured to apply, on each one of the first and second network resources 132 and 134, a digital document threshold in order to reduce a number of digital documents from which digital content may recommended. The digital document threshold may be a pre-determined maximum number of digital documents from which digital content may be recommended.

Let it be assumed that the digital document threshold is ten digital documents. As a result, the server 112 may be configured to determine ten digital documents from the first network resource 132 and ten digital documents from the second network resource 134 from which digital content may be recommended.

How the server 112 is configured to determine which ones of the digital documents of the first and the second network resources 132 and 134 are to be included in the respective ten digital documents is not particularly limiting. However, as an example, the server 112 may rank the digital documents of the given network resource based on their general popularity amongst the plurality of users 402.

In summary, at this point in the digital content pre-selection procedure 330, a total of twenty digital documents have been pre-selected out of all digital documents of the plurality of digital content items 404.

In some embodiments of the present technology, the server 112 may be configured to apply a pre-selection MLA in order to further reduce the total number of pre-selected digital documents. The pre-selection MLA may be a gradient boosted decision tree trained to rank digital documents based on their general relevance to a given user. Broadly speaking, the pre-selection MLA applies a "light formula" (i.e. a formula that is comparatively fast to process) to execute the pre-selection.

As such, the pre-selection MLA may rank the twenty digital documents based on their general relevance to the user 102 and the server 112 may identify a top number of digital documents amongst the so-ranked digital documents. Let it be assumed that the server 112 identifies top fifteen digital documents.

Therefore, in this non-limiting example, as a result of the digital content pre-selection procedure 330, the server 112 may be configured to identify a total number of fifteen pre-selected digital documents from which digital content may be recommended.

In some embodiments of the present technology, as part of the digital content selection procedure 340, the server 112 may be configured to employ a selection MLA in order to select, amongst the fifteen pre-selected digital documents, a set of selected digital documents for recommendation to the user 102.

Similarly to the pre-selection MLA, the selection MLA may be a gradient boosted decision tree trained to rank digital documents based on their general relevance to a given user. However, in comparison to the pre-selection MLA, the selection MLA may have been trained based on a larger number of digital document features and user features for ranking digital documents for a given user and, therefore, may require more processing resources for ranking a given number of digital documents if compared to the pre-selection MLA.

It is contemplated that in some embodiments of the present technology, the functionalities of the pre-selection MLA and of the selection MLA may be achieved by implementing (i) more than two MLAs or by (ii) a single MLA, without departing from the scope of the present technology.

Once the selection MLA ranks the fifteen pre-selected digital documents, the server 112 may be configured to select a topmost number of so-ranked digital documents for recommendation to the user 102. Let it be assumed that the server 112 selects five topmost of the so-ranked fifteen pre-selected digital documents for recommendation to the user 102. As such the recommended digital content set 214 displayed to the user 102 may be composed of the five topmost digital documents as ranked by the selection MLA.

Figure 9:
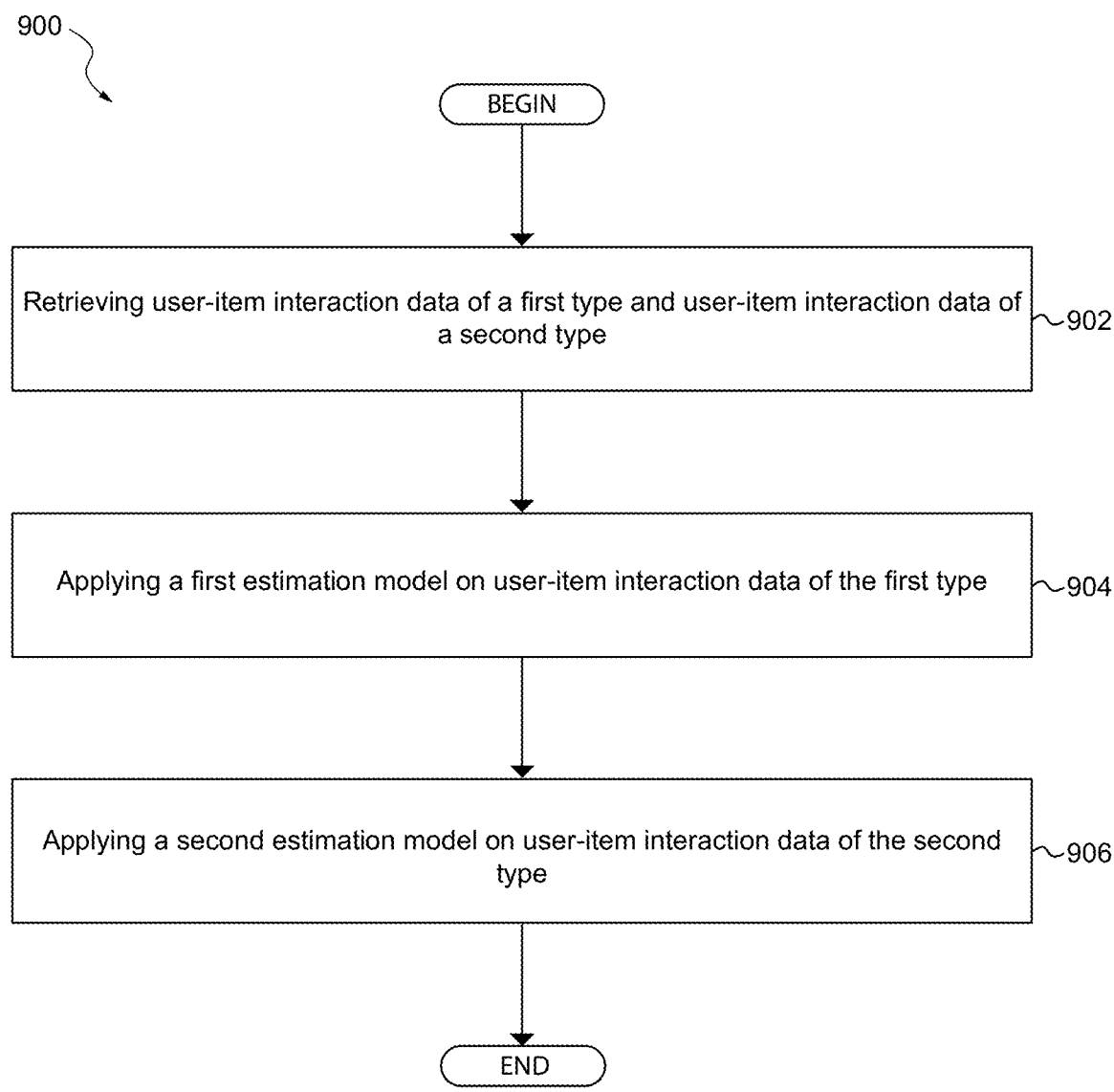
FIG. 9 depicts a block diagram of a method estimating user-item interaction data, the method executable by the server of FIG. 1 in accordance with embodiments of the present technology.

Turning now to FIG. 9, there is depicted a schematic block diagram depicting a flow chart of a method 900 for estimating user-item interaction data. Various steps of the method 900 will now be described in greater detail. It should be noted that in some embodiments, at least some of the steps of the method 900 may be omitted, replaced or additional steps may be executed to those listed below as part of the method 900, without departing from the scope of the present technology.

Step 902: Retrieving User-Item Interaction Data of a First Type and User-Item Interaction Data of a Second Type The method begins at step 902 with the server 112 retrieving user-item interaction data of the first type associated with the respective ones of the plurality of occurred user-item pairs 406. For example, with reference to FIG. 5, the server 112 may retrieve from the user database 122 the user-item interaction data 510, 512, 514 and 516 respectively associated with the occurred user-item pairs 410, 412, 414 and 416.

Also at the step 902, the server 112 retrieves user-item interaction data of the second type associated with the respective ones of the plurality of occurred user-item pairs 406. For example, with reference to FIG. 5, the server 112 may retrieve from the user database 122 the user-item interaction data 520, 522, 524 and 526 respectively associated with the occurred user-item pairs 410, 412, 414 and 416.

It should be understood that the user-item interaction data 510, 512, 514 and 516 is of a distinct type of data than the user-item interaction data 520, 522, 524 and 526. Indeed, as mentioned above, the user-item interaction data 510, 512, 514 and 516 is of the first type, whereas the user-item interaction data 520, 522, 524 and 526 is of the second type (distinct from the first type). It is contemplated that the first type and the second type of user-item interaction data may be any two of: number of clicks, number of likes, number of dislikes, number of long clicks and amount of interaction time.

It is contemplated that user-item interaction data may be associated with a respective user and a respective digital content item. In some embodiments, a given digital content item is a given digital document. In other embodiments, a given digital content item is a given network resource hosting digital documents. In further embodiments, a given digital content item is a given publisher publishing respective digital documents.

It is also contemplated that, as explained above, user-item interaction data may be stored in the user database 122 at (i) a digital document level, (ii) a network resource level, (iii) a publisher level and/or at any combination thereof without departing from the scope of the present technology.

Step 904: Applying a First Estimation Model on User-Item Interaction Data of the First Type The method 900 continues to step 904 with the server 112 applying the first estimation model 550 to the user-item interaction data 510, 512, 514 and 516 (of the first type). By applying the first estimation model 550, the server 112 estimates the user-item interaction data 580, 582, 584, 586 and 588 of the first type for respectively associated non-occurred user-item pairs 570, 572, 574, 576 and 578.

As mentioned above, a given occurred user-item pair (such as any one of the occurred user-item pairs 410, 412, 414 and 416, for example) corresponds to a respective pair having a given user and a given digital content item with which the given user has interacted. In other words, given occurred user-item pairs are user-item pairs which occurred, and for which the server 112 previously tracked, gathered and stored user-item interaction data as part of the interaction data gathering procedure 320.

However, a given non-occurred user-item pair (such as any one of the non-occurred user-item pairs 570, 572, 574, 576 and 578, for example) corresponds to a respective pair having a given user and a given digital content item with which the given user has not interacted. In other words, given non-occurred user-item pairs are user-item pairs which have not occurred, and for which the server 112 may be configured to estimate (i.e. predict) user-item interaction data as part of the interaction data estimation procedure 325.

Step 906: Applying a Second Estimation Model on User-Item Interaction Data of the Second Type The method continues to step 906 with the server 112 applying the second estimation model 560 to the user-item interaction data 520, 522, 524 and 526 (of the second type). By applying the second estimation model 560, the server 112 estimates the user-item interaction data 590, 592, 594, 596 and 598 of the second type for respectively associated non-occurred user-item pairs 570, 572, 574, 576 and 578.

As mentioned above, as part of the interaction data estimation procedure 325, the server 112 to estimate user-item interaction data for given non-occurred user-item pairs. It should be understood that the server 112 may be configured to estimate user-item interaction data for given non-occurred user-item pairs by performing the steps 904 and 906.

On the one hand, the step 904, when executed by the server 112, may allow estimating user-item interaction data 580, 582, 584, 586 and 588 of the first type for respectively associated non-occurred user-item pairs 570, 572, 574, 576 and 578. On the other hand, the step 906, when executed by the server 112, may allow estimating the user-item interaction data 590, 592, 594, 596 and 598 of the second type for respectively associated non-occurred user-item pairs 570, 572, 574, 576 and 578.

Therefore, as the result of executing the steps 904 and 906 by the server 112, the non-occurred user-item pairs 570, 572, 574, 576 and 578 may associated with the respective estimated user-item interaction data of the first type (the user-item interaction data 580, 582, 584, 586 and 588, respectively) and of the second type (the user-item interaction data 590, 592, 594, 596 and 598, respectively).

It should be understood, the server 112 may employ a different estimation model for executing the step 906 than a given estimation model employed for executing the step 904. For example, the first estimation model 550 employed during the step 904 may be an SVD model or an NN-based model. In another example, the second estimation model 560 employed during the step 906 may be an SVD model or an NN-based model. However, the first and the second estimation models 550 and 560 may be distinct estimation models without departing from the scope of the present technology.

It should also be understood that in some embodiments of the present technology, that at least one of the first and the second estimation models 550 and 560 may be trained prior to the execution of the steps 904 and 906.

It is contemplated that using distinct estimation models for estimation user-item interaction data of the first type and of the second type respectively may be beneficial in that it allows (i) specifically tailoring a first given estimation model to estimate a respective first type of user-item interaction data, while also (ii) specifically tailoring a second given estimation model to estimate a respective second type of user-item interaction data.

By training the first given estimation model based on user-item interaction data of the respective first type (as opposed to a combination of user-item interaction data of the respective first type and of some other type), may allow in some cases, a more accurate estimation of user-item interaction data of the respective first type for given non-occurred user-item pairs. By the same token, by training the second given estimation model based on user-item interaction data of the respective second type (as opposed to a combination of user-item interaction data of the respective second type and of some other type), may allow in some cases, a more accurate estimation of user-item interaction data of the respective second type for given non-occurred user-item pairs.

In some embodiments of the present technology, it is contemplated that the server 112 may execute the steps 904 and 906 of the method 900 independently from one another. In other words, it is contemplated that, in order to estimate the user-item interaction data of the first type 580, 582, 584, 586 and 588, the server 112 may not require or use the user-item interaction data of the second type 520, 522, 524 and 526. By the same token, this also means that, in order to estimate the user-item interaction data of the second type 590, 592, 594, 596 and 598, the server 112 may not require or use the user-item interaction data of the first type 510, 512, 514 and 516.

It is contemplated that, in some cases, executing the steps 904 and 906 independently from one another by the server 112, may result in a more accurate estimation of user-item interaction data as a whole for a given non-occurred user-item pair, if compared to an estimation of user-item interaction data of different types all at once.

In some embodiments of the present technology, it can be said that the execution of the step 904 of the method 900 by the server 112 may be decoupled from the execution of the step 906 of the method 900 by the server 112. In some cases, the server 112 may execute (i) the step 904 at a first moment in time and (ii) the step 906 at a second moment in time, where the first and the second moments in time are distinct.

In other cases, where the functionality of the server 112 is distributed, the execution of the step 904 and of the step 906 may be performed by two distinct computer systems, where a first computer system is configured to implement the first estimation model 550 while a second computer system is configured to implement the second estimation model 560.

As it can be appreciated from the above description, it is contemplated that the method 900 may comprise additional steps to those non-exhaustively listed above.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of estimating user-item interaction data, the method executable by a server hosting a recommendation service for providing digital content to a user, the user being one of a plurality of users of the service, a given user and a given digital content item that the given user has interacted with forming a given occurred user-item pair, user-item interaction data for occurred user-item pairs being stored in a storage communicatively coupled to the server, the method comprising:
   retrieving, by the server from the storage:
      user-item interaction data of a first type being associated with respective ones of the occurred user-item pairs, wherein the user-item interaction data of the first type comprises a length of time that a user interacted with a respective item; and
      user-item interaction data of a second type being associated with respective ones of the occurred user-item pairs, the first type being distinct from the second type;
   applying, by the server, a first estimation model to the user-item interaction data of the first type, thereby estimating user-item interaction data of the first type for non-occurred user-item pairs, wherein the applying the first estimation model comprises:
      generating, by the server, first sets of item features for the respective digital content items based on the user-item interaction data of the first type associated with the occurred and the non-occurred user-item pairs, and generating, by the server, a first set of user features for the user based on the user-item interaction data of the first type for the occurred user-item pairs associated with the user;

applying, by the server, a second estimation model to the user-item interaction data of the second type, thereby estimating user-item interaction data of the second type for the non-occurred user-item pairs, wherein the applying the second estimation model comprises:

generating, by the server, second sets of item features for the respective digital content items based on the user-item interaction data of the second type associated with the occurred and the non-occurred user-item pairs, and generating, by the server, a second set of user features for the user based on the user-item interaction data of the second type for the occurred user-item pairs associated with the user, such that the non-occurred user-item pairs are associated with respective estimated user-item interaction data of the first type and of the second type;

storing the first sets of item features and the second sets of item features; and deleting the first set of user features and the second set of user features.

2. The method of claim 1, wherein the given digital content item is one of:
a digital document;
a given network resource hosting respective digital documents; and
a given publisher publishing respective digital documents.

3. The method of claim 1, wherein the first estimation model is a Singular-Value Decomposition (SVD) model.

4. The method of claim 3, wherein the second estimation model is either one of:
an other SVD model; and
a Neural Network-based (NN-based) model.

5. The method of claim 1, wherein one of the first and the second estimation model is trained prior to the applying the one of the first and the second estimation model.

6. The method of claim 1, wherein the applying the first estimation model is executed by the server independently from the applying the second estimation model.

7. The method of claim 1, wherein the applying the first estimation model is executed by the server at a first moment in time and the applying the second estimation model is executed by the server at a second moment in time, the first moment in time being distinct from the second moment in time.

8. The method of claim 1, wherein the first sets of item features are generated such that digital content items with similar digital content have similar first sets of item features, wherein
the second sets of item features are generated such that digital content items with similar digital content have similar second sets of item features, and wherein
a given digital content item is associated with a respective first set of item features and a respective second set of item features, and wherein the method further comprises
storing, by the server, the digital content items in association with the respective first and the respective second sets of item features.

9. The method of claim 8, wherein the first set of user features are generated such that users with similar digital content preferences have similar first sets of user features, wherein the second set of user features being are generated such that users with similar digital content preferences have similar second sets of user features, wherein the first and the second set of user features are associated with the user, and wherein the method further comprises:

determining, by the server, a user-specific value for respective digital content items which is indicative of relevance of the respective digital content to the user by comparing:

the respective first set of item features with the first set of user features; and the respective second set of item features with the second set of user features.

10. The method of claim 9, wherein:
the comparing the respective first set of item features with the first set of user features comprises:
determining, by the server, a first similarity value between the user and the respective digital content item;
the comparing the respective second set of item features with the second set of user features comprises:
determining, by the server, a second similarity value between the user and the respective digital content item; and
the user-specific value of the respective digital content item being a weighted combination of the respective first and the respective second similarity value.

11. The method of claim 10, wherein the method further comprises:
selecting, by the server, a subset of digital content items based on the respective user-specific values, the digital content items in the subset of digital content items being associated with topmost user-specific relevance values;
selecting, by the server, from the subset of digital content items at least some digital content for providing digital content to the user.

12. The method of claim 11, wherein the method further comprises:
transmitting, by the server, at least some digital content from the at least some digital content items to the electronic device associated with the user.

13. The method of claim 1, wherein the second type comprises:
number of clicks;
number of likes;
number of dislikes;
number of long clicks; or
amount of interaction time.

14. The method of claim 1, wherein at least one of the first estimation model and the second estimation model is a Neural Network-based (NN-based) model comprising a first NN-portion and a second NN-portion.

15. The method of claim 14, wherein the first NN-portion is dedicated for generating an embedded item vector based on item data associated with a given item from a given user-item pair, and wherein the second NN-portion is dedicated for generating an embedded user vector based on user data associated with a given user from the given user-item pair.

16. The method of claim 15, wherein the NN-based model is trained by conditioning the first NN-portion to generate the embedded item vector and the second NN-portion to generate the embedded user vector, such that:

a similarity value between the embedded item vector and the embedded user vector is indicative of user-item interaction data of a given type for the given user-item pair.

17. A server for estimating user-item interaction data, the server hosting a recommendation service for providing digital content to a user, the user being one of a plurality of users of the service, a given user and a given digital content item that the given user has interacted with forming a given occurred user-item pair, user-item interaction data for occurred user-item pairs being stored in a storage communicatively coupled to the server, the server being configured to:
retrieve from the storage:
user-item interaction data of a first type being associated with respective ones of the occurred user-item pairs, wherein the user-item interaction data of the first type comprises a length of time that a user interacted with a respective item; and
user-item interaction data of a second type being associated with respective ones of the occurred user-item pairs, the first type being distinct from the second type;
apply a first estimation model to the user-item interaction data of the first type, thereby estimate user-item interaction data of the first type for non-occurred user-item pairs, wherein applying the first estimation model comprises:
generating first sets of item features for the respective digital content items based on the user-item interaction data of the first type associated with the occurred and the non-occurred user-item pairs, and
generating a first set of user features for the user based on the user-item interaction data of the first type for the occurred user-item pairs associated with the user;
apply a second estimation model to the user-item interaction data of the second type, thereby estimate user-item interaction data of the second type for the non-occurred user-item pairs, wherein applying the second estimation model comprises:
generating second sets of item features for the respective digital content items based on the user-item interaction data of the second type associated with the occurred and the non-occurred user-item pairs, and
generating a second set of user features for the user based on the user-item interaction data of the second type for the occurred user-item pairs associated with the user,
such that the non-occurred user-item pairs are associated with respective estimated user- item interaction data of the first type and of the second type;
store the first sets of item features and the second sets of item features; and
delete the first set of user features and the second set of user features.

18. The server of claim 17, wherein the given digital content item is one of:
a digital document;
a given network resource hosting respective digital documents; and
a given publisher publishing respective digital documents.

19. The server of claim 17, wherein the first estimation model is a Singular-Value Decomposition (SVD) model.

20. The server of claim 19, wherein the second estimation model is either one of:
an other SVD model; and
a Neural Network-based (NN-based) model.

21. The server of claim 17, wherein one of the first and the second estimation model is trained prior to the server being configured to apply the one of the first and the second estimation model.

22. The server of claim 17, wherein the server is configured to apply the first estimation model independently from being configured to apply the second estimation model.

23. The server of claim 17, wherein the server is configured to apply the first estimation model at a first moment in time and the server is configured to apply the second estimation model at a second moment in time, the first moment in time being distinct from the second moment in time.

24. The server of claim 17, wherein at least one of the first estimation model and the second estimation model is a Neural Network-based (NN-based) model comprising a first NN-portion and a second NN-portion.

25. The server of claim 24, wherein the first NN-portion is dedicated for generating an embedded item vector based on item data associated with a given item from a given user-item pair, and wherein the second NN-portion is dedicated for generating an embedded user vector based on user data associated with a given user from the given user-item pair.

26. The server of claim 25, wherein the NN-based model is trained, by the server, by conditioning the first NN-portion to generate the embedded item vector and the second NN-portion to generate the embedded user vector, such that:
a similarity value between the embedded item vector and the embedded user vector is indicative of user-item interaction data of a given type for the given user-item pair.

* * * * *